US012287022B2

(12) United States Patent
Johansson et al.

(10) Patent No.: US 12,287,022 B2
(45) Date of Patent: Apr. 29, 2025

(54) FREQUENCY-TUNED VIBRATION DAMPER DEVICE, A METHOD FOR ITS MANUFACTURE, AND A VIBRATION DAMPER ASSEMBLY INCLUDING THE DEVICE

(71) Applicant: Vibracoustic Forsheda AB, Forsheda (SE)

(72) Inventors: Robin Johansson, Värnamo (SE); Marcus Johansson, Värnamo (SE)

(73) Assignee: VIBRACOUSTIC FORSHEDA AB, Forsheda (SE)

( * ) Notice: Subject to any disclaimer, the term of this patent is extended or adjusted under 35 U.S.C. 154(b) by 891 days.

(21) Appl. No.: 17/437,557

(22) PCT Filed: Mar. 12, 2020

(86) PCT No.: PCT/EP2020/056691
§ 371 (c)(1),
(2) Date: Sep. 9, 2021

(87) PCT Pub. No.: WO2020/187698
PCT Pub. Date: Sep. 24, 2020

(65) Prior Publication Data
US 2022/0154794 A1     May 19, 2022

(30) Foreign Application Priority Data
Mar. 15, 2019   (EP) .................................... 19163045

(51) Int. Cl.
*F16F 7/108*   (2006.01)
*B60R 21/203*   (2006.01)

(52) U.S. Cl.
CPC .......... *F16F 7/108* (2013.01); *B60R 21/2035* (2013.01)

(58) Field of Classification Search
CPC ... B60R 21/2035; B60R 21/2037; F16F 7/108
See application file for complete search history.

(56) References Cited

U.S. PATENT DOCUMENTS

| 5,762,359 A | * | 6/1998 | Webber | ............... | B60R 21/2035 |
| | | | | | 280/728.2 |
| 6,592,141 B1 | * | 7/2003 | Dancasius | ........... | B60R 21/2037 |
| | | | | | 280/728.1 |

(Continued)

FOREIGN PATENT DOCUMENTS

| CN | 103192788 B | 10/2015 |
| DE | 10 2007 049 234 A1 | 4/2009 |

(Continued)

OTHER PUBLICATIONS

Machine translation of DE 10 2007 049 234 (Year: 2024).*

(Continued)

*Primary Examiner* — Bradley T King
(74) *Attorney, Agent, or Firm* — Birch, Stewart, Kolasch & Birch, LLP

(57) ABSTRACT

A frequency-tuned vibration damper device and assembly which may be used in steering wheels for motor vehicles is provided. Elastomeric stiffening bridges or connectors, integrally formed in elastomeric damper bodies, are used to obtain different damping frequencies in different spatial directions (y, z). Stiffening in specific direction(s) (y) allows larger frequency differences to be achieved. Asymmetric elastomeric damper bodies are arranged to operate with a combination of compression-mode damping and shear-mode damping along a first axis (y), and dominantly with a shear-mode damping along a different, second direction (z).

16 Claims, 12 Drawing Sheets

(56) References Cited

U.S. PATENT DOCUMENTS

| | | | |
|---|---|---|---|
| 11,305,715 B2* | 4/2022 | Kwon | B60R 21/2037 |
| 2009/0218739 A1* | 9/2009 | Terada | B60R 21/2037 |
| | | | 267/136 |
| 2017/0036687 A1* | 2/2017 | Obayashi | B62D 7/222 |
| 2019/0143927 A1* | 5/2019 | Casal Alonso | B60R 21/2037 |
| | | | 280/731 |
| 2020/0043679 A1* | 2/2020 | Nonoyama | B62D 1/04 |
| 2020/0101997 A1* | 4/2020 | Ikeda | B60R 21/2037 |
| 2020/0130630 A1* | 4/2020 | Schmeier | B60R 21/21658 |
| 2020/0139917 A1* | 5/2020 | Funk | B60R 21/2035 |
| 2020/0317123 A1* | 10/2020 | Osterfeld | B60R 16/027 |
| 2020/0339192 A1* | 10/2020 | Myklebust | B62D 7/222 |
| 2021/0031684 A1* | 2/2021 | Matsuo | B62D 1/04 |
| 2021/0269080 A1* | 9/2021 | Kim | B62D 1/10 |

FOREIGN PATENT DOCUMENTS

| | | |
|---|---|---|
| DE | 10 2016 005 020 A1 | 10/2017 |
| WO | WO 01/92752 A1 | 12/2001 |
| WO | WO 2008/127157 A1 | 10/2008 |
| WO | WO 2013/167524 A1 | 11/2013 |

OTHER PUBLICATIONS

International Preliminary Report on Patentability, issued in PCT/EP2020/056691, dated Mar. 19, 2021.
International Search Report, issued in PCT/EP2020/056691, dated Jun. 17, 2020.
Written Opinion of the International Searching Authority, issued in PCT/EP2020/056691, dated Jun. 17, 2020.

* cited by examiner

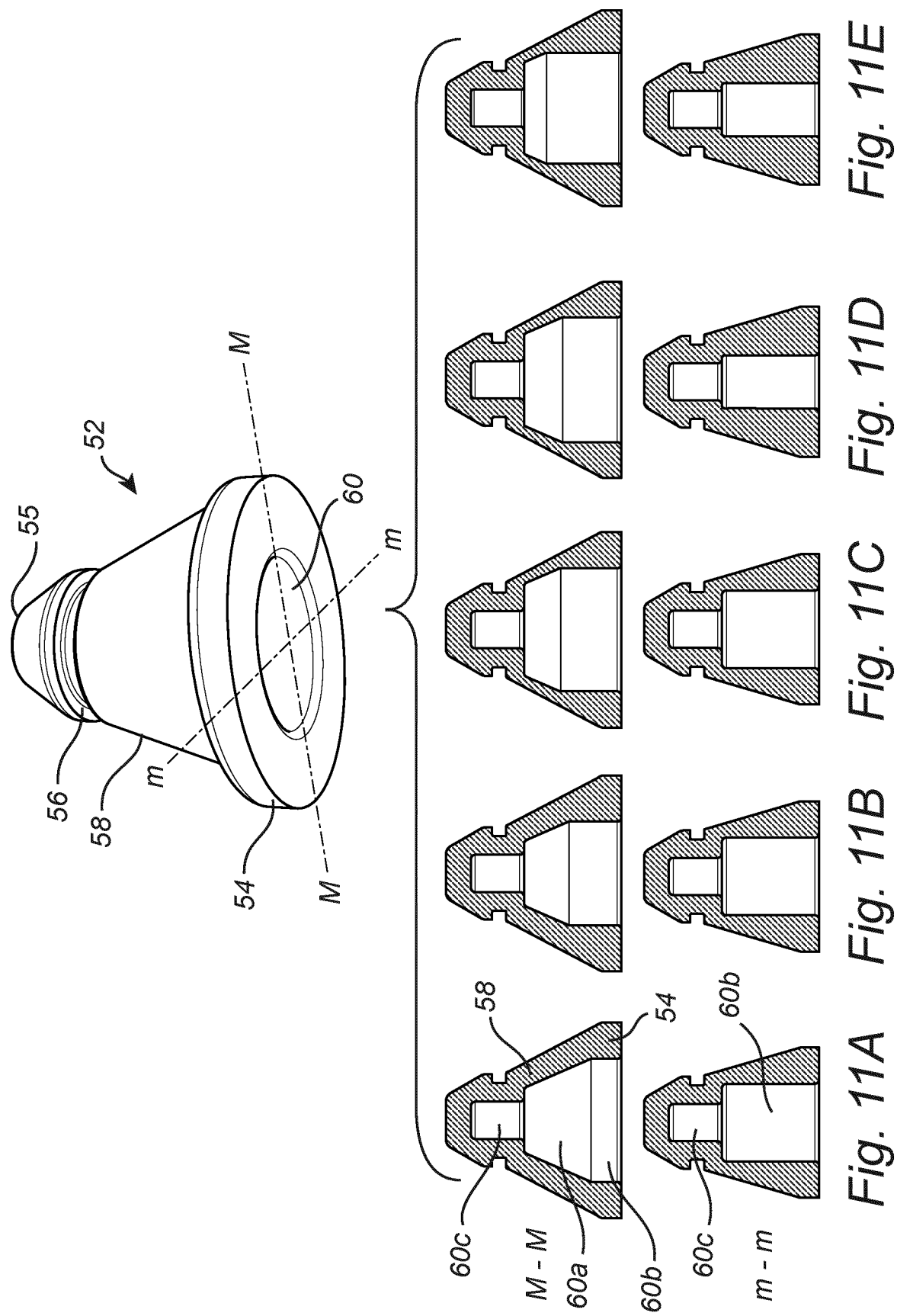

FREQUENCY-TUNED VIBRATION DAMPER DEVICE, A METHOD FOR ITS MANUFACTURE, AND A VIBRATION DAMPER ASSEMBLY INCLUDING THE DEVICE

TECHNICAL FIELD

The present disclosure relates to the field of frequency-tuned vibration dampers for motor vehicles. A frequency-tuned vibration damper device for use in a vibration-reducing damper assembly is disclosed, especially for use in a steering wheel. A vibration-reducing damper assembly including such a device is also disclosed, as well as a method of making such a device and such an assembly. The present disclosure also relates to an elastomeric damper body for use in a vibration-reducing damper assembly.

The present inventive concept relates in general to frequency-tuned vibration dampers. Such vibration dampers may be used to dampen vibrations in a vibrating structure, such as a vibrating component in a motor vehicle. A frequency-tuned vibration damper comprises a mass acting as a vibration body, and one or more elastomeric damper elements. The mass and the damper elements together provide a dampened spring-mass system, and may be connected to the vibrating surface, optionally by means of one or more intermediary components.

The weight of the mass, and the stiffness and damping of the elastic damper elements constitute tuning parameters, and are selected to provide a damping effect on the vibrating structure which can be expected to vibrate at one or more predetermined target frequencies. When the vibrating structure vibrates at a target frequency, the mass or vibration body is caused to oscillate/resonate at essentially the same frequency as the structure but out of phase, such that the vibrations of the structure is substantially dampened. In some applications, frequency-tuned dampers may be tuned to different frequencies in different spatial directions.

BACKGROUND

The function of frequency-tuned vibration dampers, also termed tuned mass dampers, dynamic dampers or vibration absorbers, is based on a dampened spring-mass system which counteracts and reduces vibrations in a structure or surface to which the damper is connected by using one or more elastic damper elements for transferring vibrations from a vibrating structure to at least one mass which is caused to vibrate out of phase such as to dampen the vibrations. WO 01/92752 A1, WO 2013/167524 A1, and WO 2008/127157 A1 disclose examples of frequency-tuned vibration dampers.

In the automotive industry, some steering wheels are provided with frequency-tuned vibration damper assemblies for reducing steering wheel vibrations caused by vibrations from the road and engine being transferred to the steering wheel. In such damper structures, the weight of a gas generator, also termed inflator, may be used as at least a part of the weight of the mass in the spring-mass system. Accordingly, such prior-art vibration dampers may be integrated in the airbag module of the steering wheel.

A known damper device for damping vibrations in a steering wheel comprises a mounting frame or console made of a dimensional stable plastic material, and four elastomeric damper elements connected to the mounting frame. When combined with the inflator, the damper device and the mass of the inflator together form a vibration damper assembly. The mounting frame is typically attached to the steering wheel representing the vibrating structure. Each elastomeric damper element extends along a main axis from a base of the damper element to an opposite distal end of the damper element. Each damper element has a first circumferential mounting groove close to its base and a second circumferential mounting groove close to its distal end. Each damper element is connected to the mounting frame by its first mounting groove and to the mass by its second mounting groove. Thereby, the inflator is elastically connected to the steering wheel via the damper device. Such elastomeric damper elements are disclosed in the above-mentioned documents.

A steering wheel may present different vibration frequencies in different directions. Especially, horizontal vibrations and vertical vibrations in the steering wheel may have different frequencies. Some prior art dampers of the above kind are designed to dampen different vibration frequencies using one damper device only. The damper assembly is thus tuned to more than one vibration frequency. To this end, each damper element may have an overall elongate or elliptic shape as disclosed in the above-mentioned document WO 2013/167524 A1. However, in some applications, the difference in damping frequency has shown to be insufficient. Also, in some applications, the structure into which the damper assembly is to be mounted requires a more flexible solution regarding the structure of the damper assembly.

SUMMARY OF INVENTION

In the light of the above, it is an object of the present inventive concept to provide a solution according to which the above-mentioned disadvantage of the prior art is addressed.

According to a first aspect of the inventive concept, there is provided a vibration damper device for connecting a vibrating structure to a damper mass for forming a frequency-tuned damper assembly. The vibration damper device comprises:

two or more elastomeric damper portions; and
a mounting frame made from a more rigid material that the elastomeric damper portions, said mounting frame extending in a main plane, and presenting a pair of frame wall portions extending transversally to the main plane,
    wherein each elastomeric damper portion extends along a main axis of the elastomeric damper portion from a base of the elastomeric damper portion connected to the mounting frame at the main plane to a distal end of the elastomeric damper portion,
    wherein each elastomeric damper portion presents a main part located along the main axis between the base and the distal end of the elastomeric damper portion, and
    wherein said elastomeric damper portions comprise a first pair of elastomeric damper portions connected to the mounting frame at locations spaced along a first axis extending in the main plane;

The vibration damper device further comprises a pair of elastomeric stiffening bridges,
    wherein each elastomeric stiffening bridge is associated with a respective elastomeric damper portion of said first pair of elastomeric damper portions,
    wherein each elastomeric stiffening bridge connects at least the main part of the associated elastomeric damper portion to an associated one of said frame wall portions at a location along the main axis between the base and the distal end of the associated elastomeric damper portion, for stiffening the damper portion with respect to damping movements along said first axis; and wherein each stiffening bridge and its associated damper portion are made in one piece with each other from an elastomeric material to form an elastomeric damper body.

During a damping operation in prior-art vibration dampers, each elastomeric damper element undergoes an elastomeric shear movement perpendicular to the main axis of the damper element. The stiffness and, accordingly, the tuned frequency, correspond to the shear forces required to generate such a shear movement. Prior-art dampers are thus specifically designed to allow each elastomeric damper element to freely perform such a shear movement perpendicular to its main axis. The inventive concept goes contrary to this conventional design principle in that the free shear movement of some of the damper portions is restricted in a defined direction by the arrangement of the elastomeric stiffening bridges, connecting parts of some elastomeric portions to wall portions of the mounting frame. Other elastomeric portions may be left unstiffened. As a result, an increased difference in tuning frequency in different spatial directions may be obtained. Each elastomeric damper portion of a first pair of elastomeric damper portions is associated with an elastomeric stiffening bridge. In a steering wheel application, this first pair of damper portions and their associated stiffening bridges may typically be arranged on a horizontal axis of the steering wheel in order to increase the stiffness of the damper device in the horizontal direction. A second pair of elastomeric damper portions arranged on a vertical axis may be designed without any stiffening bridges. Each elastomeric damper portion on the first or horizontal axis forms, together with its associated stiffening bridge, an elastomeric damper body. In a damping operation, this elastomeric damper body may operate with a combination of compression-mode damping and shear-mode damping, wherein the compression mode damping takes place in the horizontal direction and may be dominant over the shear-mode damping in the horizontal direction. During a damping movement in the horizontal direction, the stiffening bridges may undergo primarily an alternating compression and tensioning movement in the horizontal direction. Compression and tensioning forces are in general higher than shear forces, whereby the overall effect is a substantial stiffening in the horizontal direction, while leaving the vertical shear movement essentially unaffected, or at least affected to a much smaller degree as will be explained further below.

Each elastomeric bridge may connect the main part of its associated damper portion to an associated one of the frame wall portions at a location along the main axis between the base and the distal end of the damper portion. The connection to the damper portion should be at least at a sufficient level from the mounting frame along the main axis to stiffen the conventional shear mode movement of the main part of the damper portion in the required degree. Each elastomeric portion may typically present a main part located along the main axis between the base and the distal end. This main part will, without the use of any stiffening bridge, constitute the part of the elastomeric portion in which the shear deformation takes place during a damping operation. In contrast, the attached base of the elastomeric portion may be substantially stationary during a damping operation. Therefore, the stiffening bridge should preferably connect at least to this main part of the elastomeric portion, at a location between the top of the base and the distal end of the elastomeric portion, in order to provide the stiffening effect, i.e. to restrict movements of the elastomeric damper portion along the horizontal axis. Thus, the stiffening bridge may typically be located at least at one or more levels where the shear movement would take place if no bridge was present. The higher up the bridge connects to the elastomeric damper portion, the more stiffening and frequency increase may be obtained. A maximum height may normally be defined by the level at which the inflator is attached to the elastomeric portion. Each bridge may be connected to its associated damper portion continuously along an imaginary interface, or optionally at distinct portions along the interface. Each bridge may extend all the way down to the mounting frame, or optionally present some space between the bridge and the mounting frame.

In some embodiments, the stiffening bridges extend substantially along the first axis.

In some embodiments, each stiffening bridge has a limited extension in a circumferential direction relative to the main axis of the associated damper portion, and the elastomeric damper body formed by the stiffening bride and the damper portion is:

asymmetric with respect to a plane which is perpendicular to the main plane and to the first axis, and symmetric with respect to a plane defined by the main axis and the first axis.

In some embodiments, each damper portion presents a circumferentially extending mounting groove at a distance from its distal end, wherein each stiffening bridge connects the associated damper portion to the associated frame wall portion between the base and the mounting groove of the associated damper portion.

In some embodiments, the stiffening bridges extend to a bridge height level in the direction of the main axis of the associated damper portion which is at least 10%, preferably at least 25%, and more preferably at least 50% of a distance between the main plane and the mounting groove of the associated damper element.

In some embodiments, damper device further comprises an elastomeric annular part, which is connected to and extends along the mounting frame and which is made in one piece with the elastomeric damper portions and the elastomeric bridges.

In some embodiments, the two or more elastomeric damper portions further comprise a second pair of damper portions connected to the mounting frame at locations mutually spaced along a second axis, which extends in the main plane and transversally to the first axis. In a steering wheel application, this second axis would typically be the vertical direction. In some embodiments, each damper portion of the second pair of damper portions is connected to the mounting frame at its base only and is not stiffened by any stiffening bridge, in order to increase the difference in tuning frequencies along the first axis and the second axis.

Some or all of the damper portions may present, over at least a part of the damper portion along its main axis, a cross-section which is not rotational symmetric with respect to the main axis of the damper portion. Such asymmetric damper portions may be used in combination with the inventive concept in order to even further increase the difference in damping frequency in along the first axis and the second axis. As an example, where the elongate cross-section presents a major axis and a minor, the damper portions may be oriented in the same direction such that all of the major axes are parallel with the first axis. In such an embodiment, the stiffening bridges as well as the damper portions as such may both contribute to the increased frequency difference. It is also possible to use a combination of symmetrical and non-symmetrical elastomeric damper portions.

According to a second aspect of the inventive concept, there is provided a frequency-tuned damper assembly adapted to be connected to a vibrating structure presenting vibrations of different vibration frequencies in different directions. The damper assembly comprises a damper device according to the inventive concept as describe above, and a damper mass which is connected to the distal ends of the damper portions of the damper device, wherein the damper assembly is frequency-tuned to two different frequencies corresponding to said different vibration frequencies of the vibrating structure. When used in a steering wheel, the damper mass may be formed at least partly by an inflator of an airbag module.

According to a third aspect of the inventive concept, there is provided a method for manufacturing a damper device as described above. The method comprises molding all elastomeric damper portions and all elastomeric connecting bridges in one piece with an elastomeric annular portion of the mounting frame. In a preferred embodiment, a 2K injection molding machine is used for the molding, wherein the elastomeric damper portions, the stiffening bridges and the annular portion together form one component and the mounting frame forms a second component, said first and second components being bonded to each other in the molding process.

According to a fourth aspect of the inventive concept, there is provided an elastomeric damper body for use in a frequency-tuned damper device, said elastomeric damper body comprising:

an elastomeric main damper part which extends along a main axis of the main damper part between a first end of the main damper part and a second end of the main damper part; and an elastomeric bridge part which is formed in one piece with the main damper part and which extends from the main damper part along a first axis perpendicular to the main axis, wherein said bridge part has a limited extension in a circumferential direction relative to the main axis such that the elastomeric damper body as a whole is asymmetric with respect to a plane defined by the main axis and a second axis perpendicular to the main axis and to the first axis.

According to a further aspect of the inventive concept—according to which the inventive concept is defined partly in terms of damping modes—there is provided a vibration damper device for connecting a vibrating structure to a damper mass for forming a frequency-tuned damper assembly, said vibration damper device comprising a mounting frame extending in a main plane; and at least one elastomeric damper body including, in one piece with each other:

an elastomeric damper portion extending along a main axis of the damper portion perpendicular to the main plane; and an elastomeric stiffening bridge portion which connects to one side of the damper portion and extends in a radial direction in relation to the main axis away from the damper portion to provide a stiffening effect in the radial direction such that the damper body as a whole is arranged to operate with a combination of compression-mode damping and shear-mode damping in a first direction parallel to the radial direction, and dominantly with a shear-mode damping in a second direction which is perpendicular to the radial direction and to the main axis.

Further preferred embodiments are set out in the dependent claims.

The above described technical effect of the inventive concept, as well as further advantages, details and variants thereof will become apparent from the following description.

BRIEF DESCRIPTION OF THE DRAWINGS

The inventive concept, some non-limiting preferred embodiments, and further advantages of the inventive concept will now be described with reference to the drawings in which:

FIGS. 11A to 11E illustrate examples of an elastomeric damper portion for use in a damper device.

DETAILED DESCRIPTION OF PREFERRED EMBODIMENTS

1$^{st}$ Embodiment

Figure 1:
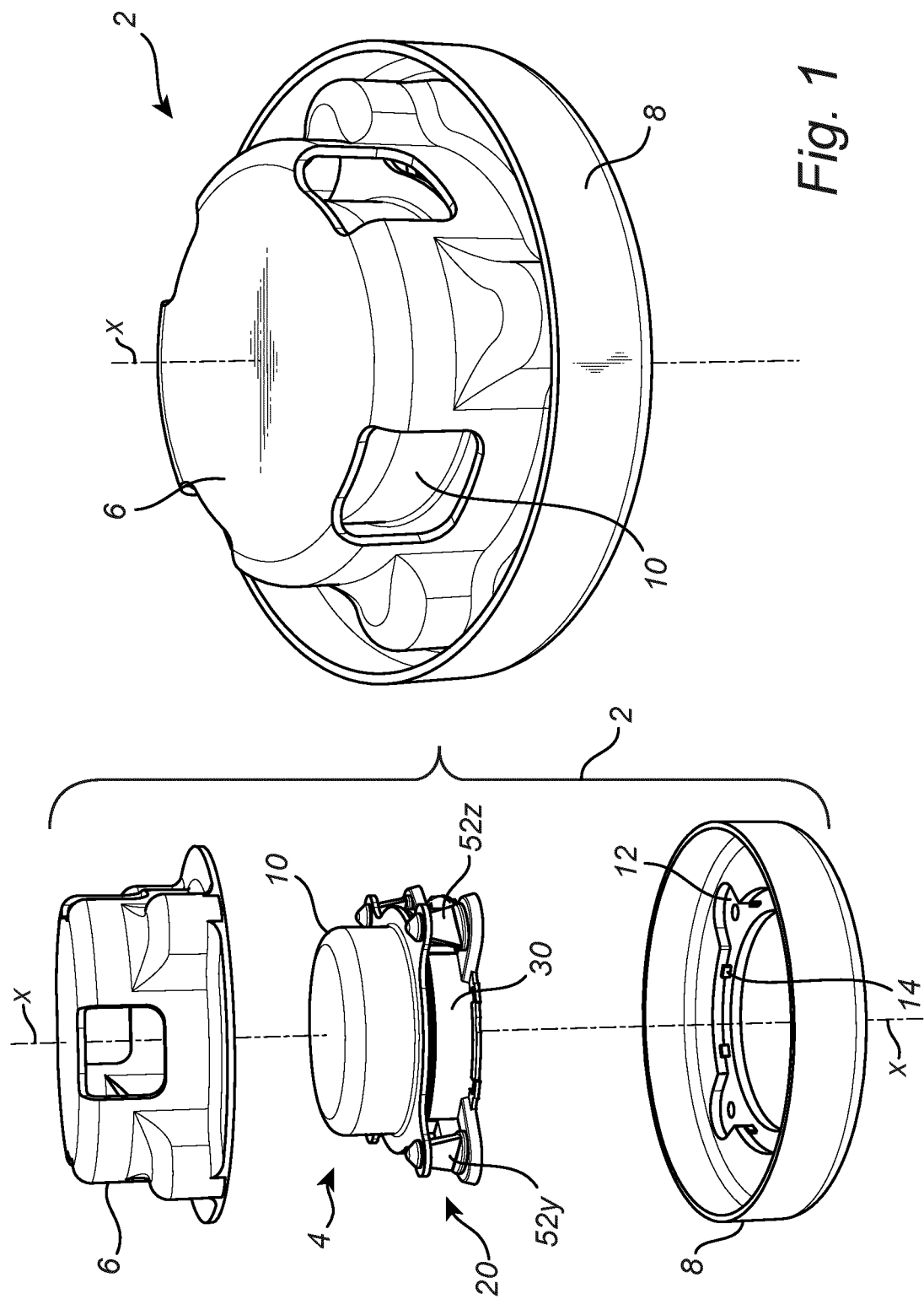
FIG. 1 illustrates an assembled unit for use in an airbag module.
Figure 2:
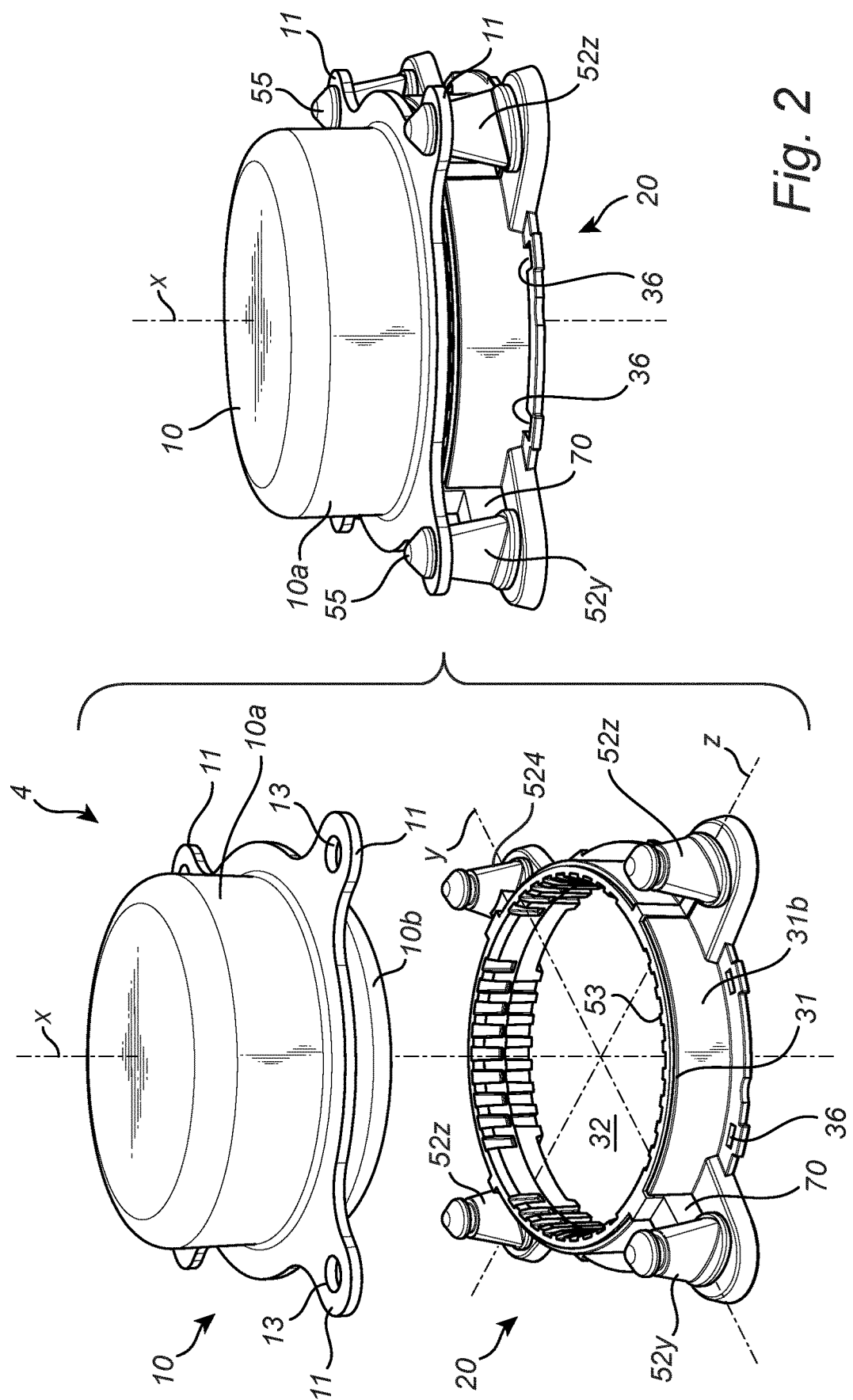
FIG. 2 illustrates a vibration damper assembly comprised in the unit in FIG. 1.

FIG. 1 illustrates to the right a unit 2 for use in an airbag module for a steering wheel in a motor vehicle. The unit 2 includes a vibration damper assembly 4 according to a first embodiment of the inventive concept. FIG. 1 illustrates to the left the same unit 2 in a partly unassembled state. FIG. 2 shows the damper assembly 4 in greater detail. In use, the unit 2 may be installed in an airbag module to be mounted in a steering wheel of a motor vehicle. The unit 2 further comprises a diffusor 6 on one side of the damper assembly 4, and a mounting plate 8 on the opposite side of the damper assembly 4.

The diffusor 6 is used to control a gas flow from an inflator/gas generator 10 forming part of the damper assembly 4. The dimensions are such that the gas generator 10 is allowed to move inside the diffusor 6 without contacting the diffusor 6 during damping operations. The mounting plate 8 is used to mount the unit 2 in the steering wheel, i.e. to a vibrating structure the vibrations of which are to be dampened. In alternative embodiments, the damper assembly 4 may be connected to the vibrating structure via other means than the mounting plate 8. In the illustrated embodiment, the mounting plate 8 comprises a number of cavities 12, and a number of guide pins 14 for receiving and maintaining correct orientation of the damper assembly 4 in relation to the mounting plate 8.

Throughout the present application, a Cartesian coordinate system is used as follows: the x axis is co-axial with the steering column of the car and forms the main axis of the unit 2 and the damper assembly 4. The y axis and the z axis correspond essentially to the horizontal direction and the vertical direction, respectively, when the unit 2 is mounted in a steering wheel. The coordinate system is fixed to the steering wheel and to the damper assembly 4, meaning that the orientations of the y axis and the z axis may change when the driver turns the steering wheel. Radial and circumferential directions are in relation to the x axis.

FIG. 2 illustrates to the right the damper assembly 4, and to the left the damper assembly 4 in an unassembled state. In the illustrated embodiment, the inflator 10 presents four radially extending mounting tabs 11 in the yz plane, each having a mounting opening 13. The inflator 10 has an upper part 10a and a lower part 10b located on the opposite sides of the mounting tabs 12 with respect to the x axis. In the assembled damper assembly 4, the inflator 10 is attached to and elastically supported by the damper device 20 in the manner described below.

Figure 3:
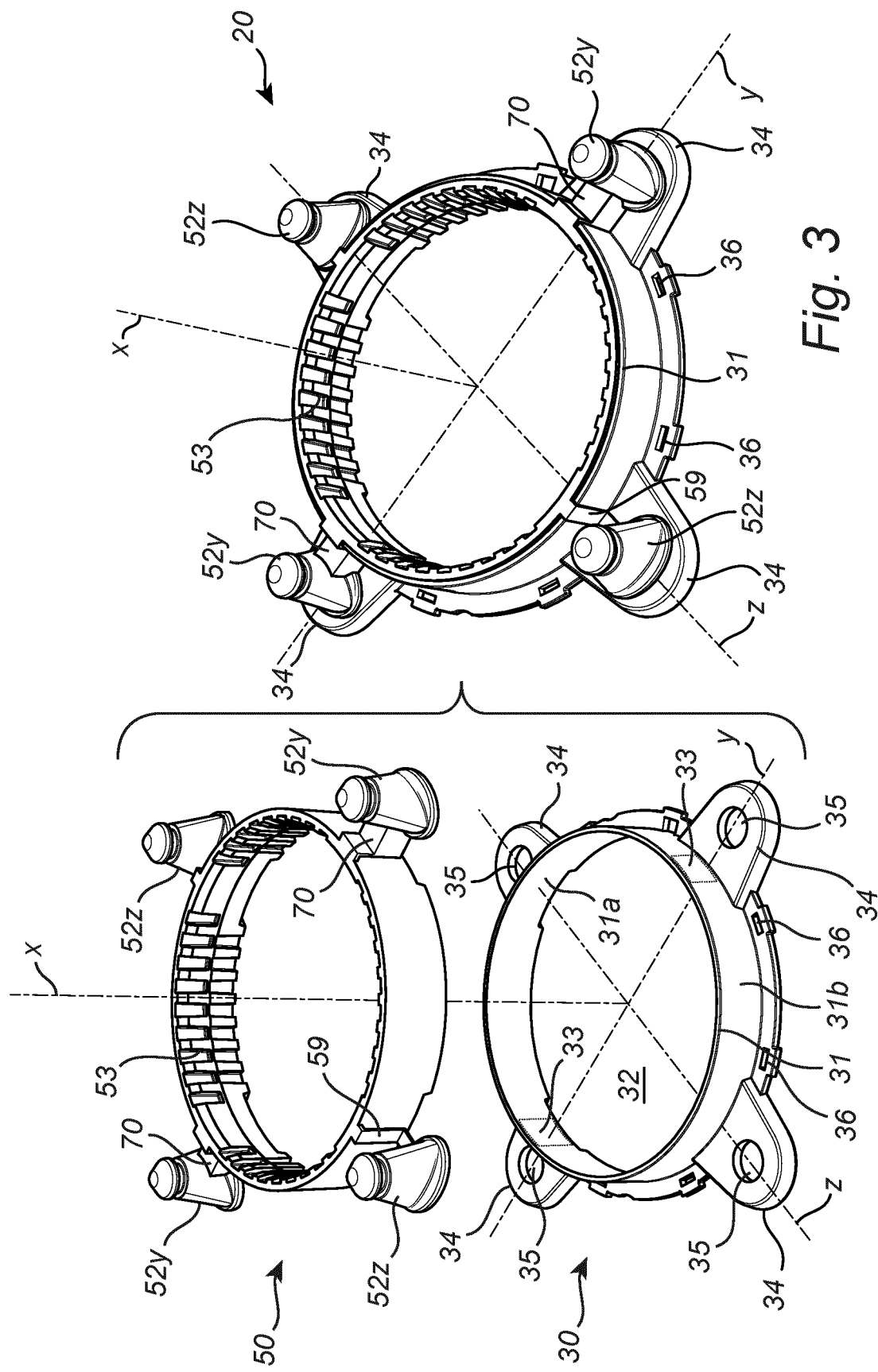
FIG. 3 illustrates a first embodiment of a damper device.
Figure 4:
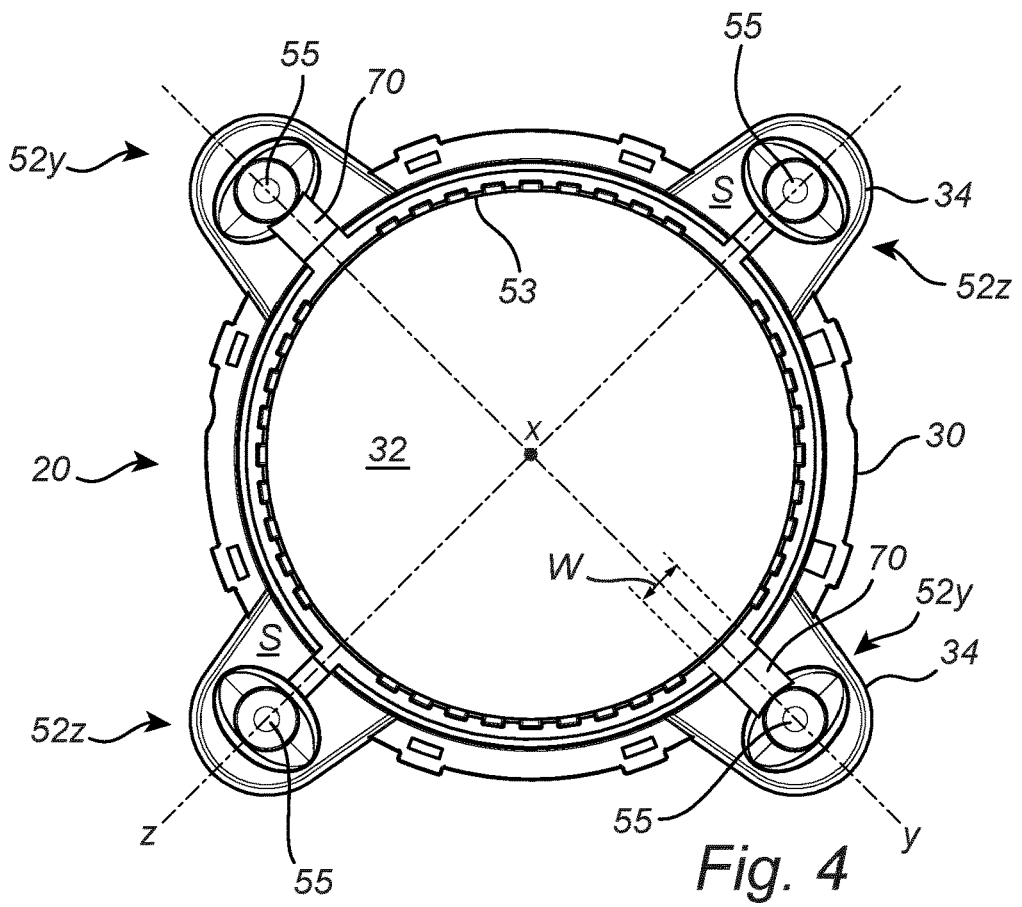
FIGS. 4 and 5 illustrate a top view and a bottom view, respectively, of the damper device in FIG. 3.
Figure 5:
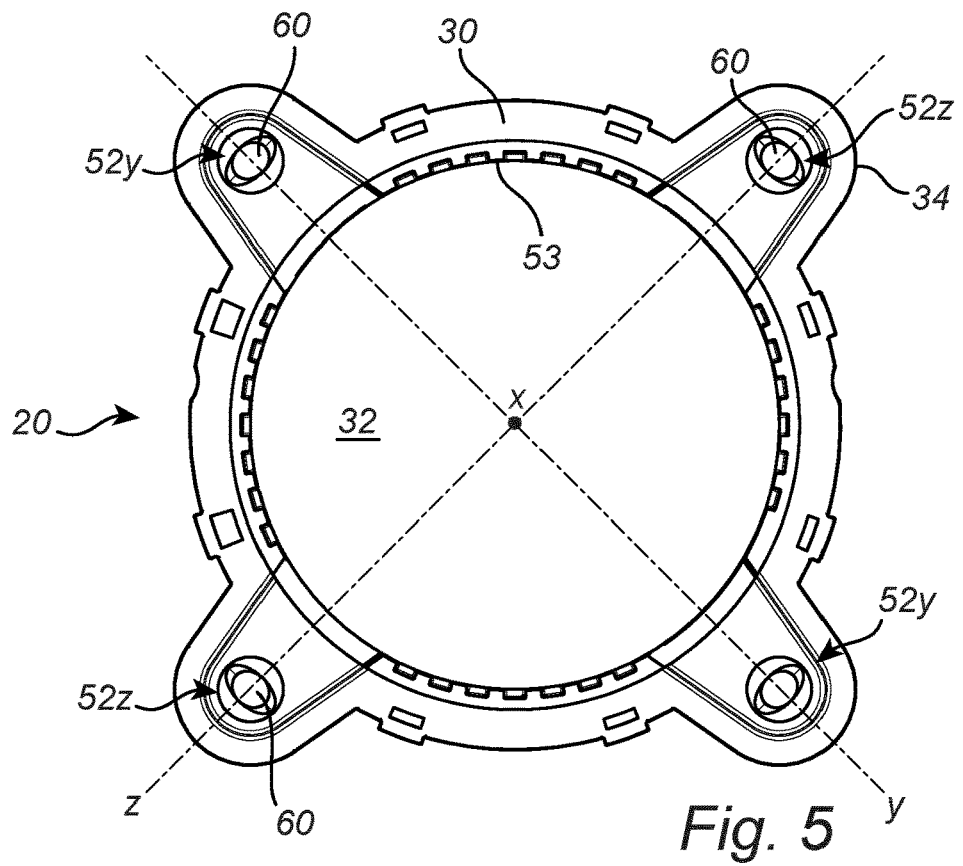

A vibration damper device 20 according to a first embodiment of the inventive concept will now be described with reference to FIGS. 2 to 6A-6C. FIG. 3 shows to the right a perspective view of a damper device 20. The damper device 20 comprises two components: a mounting frame or console 30 and an elastomeric second component 50. The mounting frame 30 is preferably made by a dimensional stable material, such as dimensional stable plastic material. The second component 50 is a one-piece elastomeric component made from an elastomeric material, such as silicone rubber. The mounting frame 30 is more rigid than the elastomeric component 50.

For explanation purposes only, the left-hand side of FIG. 3 illustrates the mounting frame 30 and the elastomeric component 50 of the damper device 20 shown separated from each other. However, in preferred embodiments these two components 30 and 50 are manufactured in one manufacturing step, such as by a 2K injection molding machine to form a 2K device, i.e. molded during one single process with no need for any subsequent assembly of the components. In such a process, the elastomeric component 50 will also become bonded to the mounting frame 30 during the molding process. Alternative embodiments may be envisaged where the two components 30 and 50 are formed in separate steps, for instance by first forming the mounting frame 30, and thereafter forming the elastomeric component 50, either as a separate component 50 to be attached to the mounting frame 30, or by an overmolding process directly on the mounting frame 30. Adhesives may also be used.

The mounting frame 30 extends along the yz plane and has a general annular configuration. As a non-limiting example, the dimensions of the mounting frame 30 may be in the order of 10 cm in the yz plane, and in the order of 1 cm along the x axis. The mounting frame 30 comprises an annular frame wall 31 which extends transversally to the yz plane and extends circumferentially relative to the x axis. A radially inner surface 31a of the frame wall 31 defines a central opening 32 for receiving the lower part 10b of the inflator 10 with a radial spacing to allow the inflator 10 to move in the yz plane relative to the mounting frame 30 during damping operation. Two opposite wall portions 33 of the annular frame wall 31 located on the y axis are highlighted in FIG. 3. At the radially outer side 31b of its frame wall 31, the mounting frame 30 presents four radially extending mounting tabs 34, each having a mounting opening 35, and a plurality of circumferentially spaced slits 36. When the damper assembly 4 is connected to the mounting plate 8, each mounting tab 34 is received in an associated cavity 12 of the mounting plate 4, and each guide pin 14 of the mounting plate 4 is received in an associated slit 36 of the mounting frame 30. The damper assembly 4 and the mounting plate 8 may be secured/locked to each other along the x axis in various ways, such as for example by using a bayonet mount, by melting the guide pins 14 if the mounting plate 8 is made by plastic, or by simply clamping the damper assembly 4 between mounting plate 8 and diffusor 6 (the diffusor and the mounting plate may be clamped together by screws).

Figure 6A:
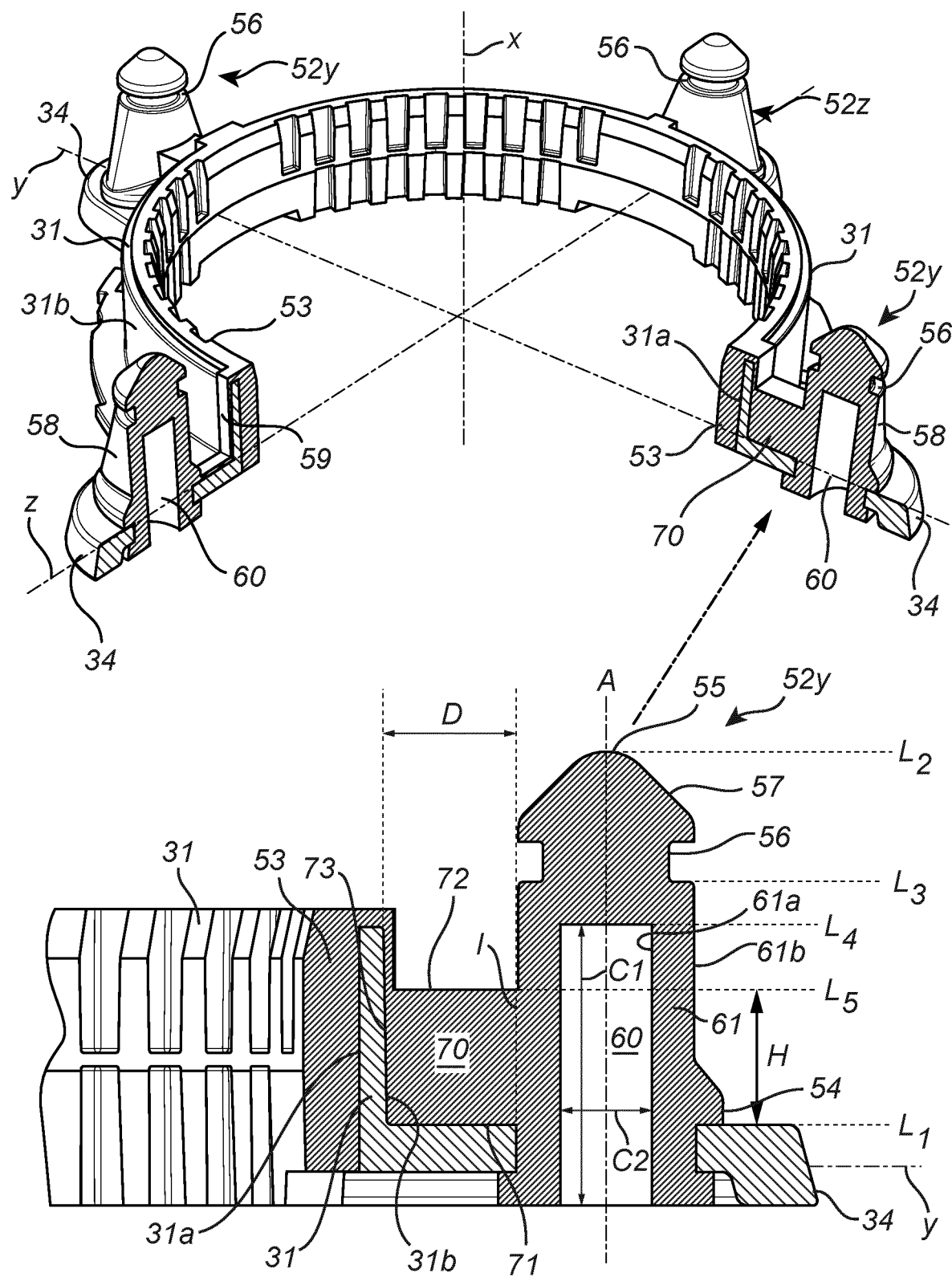
FIG. 6A illustrates in a larger scale details of the damper device in FIG. 3.

A damper device 20 according to the inventive concept comprises two or more elastomeric damper portions 52. The damper device 20 according to the first embodiment comprises four elastomeric damper portions 52y, 52z which form integral parts of the molded elastomeric component 50. The four damper portions include a first pair of damper portions 52y connected to the mounting frame 30 at locations mutually spaced along the y axis, and a second pair of damper portions 52z connected to the mounting frame 30 at locations mutually space along the z axis. In the following description, reference numeral 52 will be used as a general reference to all damper portions of the elastomeric component 50. Each damper portion 52 is located at a radial distance from the frame wall 31 of the mounting frame 30. In FIG. 6A, this radial distance is marked "D" for one of the elastomeric damper portions 52y. The distance "D" may vary between the damper portions.

In the illustrated embodiment, all damper portions 52 are identical. In alternative embodiments, the design of the damper portions 52y may differ from the design of the damper portions 52z. The design may differ with respect to the outer shape of the damper portions and/or the shape of inner cavities if such are present. Such differences may be used for frequency-tuning purposes. In the illustrated embodiment, all damper portions 52 have also the same radial distance to the x axis. In alternative embodiment, the damper portions may have different distances to the x axis. For instance, the damper portions may be arranged in an oval or elliptic configuration. Furthermore, if the damper portions have a non-circular symmetry as in the illustrated embodiment, they may be oriented in the same direction or in different directions.

The elastomeric component 50 further comprises an elastomeric annular portion 53, which is connected to and extends continuously around the inner surface 31a of the frame wall 31 of the mounting frame 30. The annular elastomeric portion 53 is in this embodiment molded in one piece with the elastomeric damper portions 52y, 52z as will be described in detail below. The annular portion 53 is circular in the illustrated embodiment, but other configurations such as oval/elliptic may also be considered.

As shown in the cross-section in FIG. 6A, each damper portion 52 extends along a main axis A from a base 54 at level L1 to a distal end 55 at level L2. As a non-limiting illustrative example, the distance L1-L2 may be in the order of 10-30 mm. The base 54 of each damper portion 52 is connected to an associated mounting tab 34 of the mounting frame 30 at level L1. In some embodiments, the base 54 is essentially stationary, or present only a limited movement, during damping operation. In the illustrated embodiment, the connection between the damper portion 52 and the mounting frame 30 is a bonding resulting from the molding process, preferably an injection 2K molding process. As shown in FIG. 6, in order to obtain a more secure connection, the elastomeric material may optionally extend into the openings 35 of the mounting tabs 34, and further optionally down on the underside of the mounting tabs 34.

Each damper portion 52 presents a circumferentially extending mounting groove 56 at level L3, located at a distance along the main axis A from the distal end 55. The distance L1-L3 may be larger than the distance L3-L2. Each damper portion 52 further presents an insertion portion 57 between its mounting groove 56 and its distal end 55. The insertion portion 57 may be conical or frusto-conical as illustrated. Each elastomeric damper portion 52 further presents a main part 58 extending along the main axis A between the base 54 and the mounting groove 56 of the damper portion 52. The main part 58 may be considered as the part of the damper portion 58 which is mainly active or operational in the damping function of the damper portion 52, and which undergo primarily a shear deformation during the damping operation. The base 54 may be wider than the main part 58 in the yz plane as illustrated.

One of more of the damper portions 52 may be provided with an inner cavity 60 extending along the main axis A. The cavity 60 may be open towards the base 54. In some embodiments as the one illustrated, all damper portions 52 may have an inner cavity 60. In other embodiments, only some damper portions have an inner cavity 60. For instance, the design with respect to inner cavities may differ between the damper portions 52y and the damper portions 52z. Still in other embodiments, one or more damper portions 52 may be designed as a solid elastomeric damper portion without any inner cavity 60. For each damper portion 52, the design of the inner cavities, and also the choice of including an inner cavity or not in the damper portion, constitute further frequency-tuning parameters.

In embodiments where an inner cavity 60 is present, the cavity 60 may present a height C1 along the main axis A and a cross section C2 perpendicular to the main axis A. The height C1 and the cross-section C2 may be varied for frequency tuning purposes. The dimension of the cross-section C2 may be equal or different in the y direction and the z direction. In the illustrated embodiment, the cross-section is elliptic. The dimension of the cross section C2 may differ along the x axis. These parameters may also be used for frequency tuning purposes.

As illustrated in FIG. 6A, the inner cavity 60 extends up to a level L4 inside the damper portion 52. A higher cavity 60 generally generates a less stiff damper portion 52. The main part 58 of the damper portion 52 is defined by a wall 61 having an inner surface 61a defining the inner cavity 60, and an outer surface 61b defining the outer peripheral surface of the damper portion 52. The thickness and the inclination of the wall 61 constitute further frequency-tuning parameters.

When connecting the damper device 20 with the inflator 10 to form the damper assembly 4, the mounting openings 13 of the inflator 10 are first aligned with the elastomeric damper portions 52 of the damper device 20. Thereafter, the frusto-conical insertion parts 57 of the damper portions 52 are guided through the mounting openings 13. For this operation, rod-shaped tools may be inserted into the inner cavities 60 to push the insertion parts 57 through the mounting openings 13 until the mounting groove 56 of each elastomeric damper portion 52 engages the rim of the associated mounting opening 13 of the inflator 10.

During damping operation according to the prior art, vibrations of the vibrating structure (e.g. vibrations of the steering wheel) are transferred via the elastomeric elements 52 to the damper mass represented by the inflator 10. The inflator 0 is thereby caused to vibrate out of phase such that the vibrations in the steering wheel are dynamically dampened. Such a damping operation is illustrated schematically in FIG. 7B along the z axis, where the movement of the damper portion 52z along the z axis is exaggerated for explanation purposes only. In practice, the movement during the damping operation is in the order of perhaps 1 mm only or less, for instance as small as 0.05 mm. When the main part 58 of the damper portion 52z moves along the z axis, the main part 58 undergoes a shear deformation as illustrated in FIG. 7B. In the following, this type of damping function will be referred to as "shear-mode damping". Also as illustrated in FIG. 7B, the base 54 of the damper portion 52z may be designed to undergo essentially no movement during the damping operation. The stiffness in the z axis correspond to the shear forces required to accomplish a certain shear deformation in the z direction. In FIG. 7B, an arrow V represents the vibration movement when the damper portion 52z is moving radially towards the frame wall 31. Obviously, the opposite damper portion 52z on the z axis may at the same time move in the same direction, but away from the frame wall 31.

In the prior-art, the damping operation is based on the above-described shear-mode damping of elastomeric damper elements. Accordingly, in the prior art the design is therefore intentionally such that the main part 58 of each elastomeric damper portion is free to move in all directions, as shown especially at the space S in FIG. 7B between the damper portion 52z and the frame wall 31.

A steering wheel may vibrate with different frequencies horizontally (y axis) and vertically (z axis), and some frequency-tuned vibration damper assemblies are tuned to more than one frequency. Some prior art damper assemblies using shear-mode damping may be tuned to a first frequency in the horizontal direction and to a second, different frequency in the vertical direction. The horizontal vibrations may have a higher frequency than the vertical vibrations. However, in many applications, the obtained difference in damping frequency has shown to be insufficient. Also, in some applications a greater flexibility in mounting and frequency tuning is desired. Further, the frequency ranges available may be insufficient in the prior-art damper assemblies.

The damper assembly 4 and the damper device 20 according to the inventive concept are designed to solve or at least reduce this problem, i.e. designed to make it possible to obtain a difference in the tuned frequencies in different directions, e.g. horizontally and vertically, and especially to obtain larger differences than possible using prior-art dampers.

According to the inventive concept, the damper device 20 further comprises a pair of elastomeric stiffening bridges 70, each stiffening bridge 70 being associated with a respective one of the damper portion 52y located on the y axis. Each elastomeric bridge 70 connects the associated damper portion 52y to an associated wall portion 33 of the frame wall 31. The wall portions 33 are indicated to the left in FIG. 3. Each elastomeric stiffening bridge 70 and its associated elastomeric damper portion 52y are made in one piece with each other from an elastomeric material to form an elastomeric damper body. An imaginary interface between the stiffening bridge 70 and the damper portion 52y is indicated at reference "I" in FIG. 6A. As will be seen from the figures and as will be described further below, the elastomeric bridges 70 also form part of the overall elastomeric component 50. Thus, during the manufacturing process, the elastomeric annular portion 53, all damper portions 52, and all bridges 70 may be molded in one piece, preferably in a 2K injection molding process where the mounting frame 30 is molded in the same process. For molding purposes only, the damper portions 52z on the z axis may be connected to the annular portion 53 via very thin (<1 mm thick) skin portions 59 of elastomeric material on the surface 31b and on the mounting tongues 34. These skin portions 59 have essential no function at all in the final product.

The bridges 70 are stiffening bridges 70, and constitute integrally formed parts that have a stiffening function or stiffening effect on the movements of the main parts 58 of the damper portions 52y along the y axis during damping operation. Therefore, the stiffening bridges 70 should preferably be connected to the elastomeric damper portions 52y at a sufficient high level L5 to generate a sufficient degree of stiffening along the y axis. As a result, each damper body formed by a stiffening bridge 70 and the associated damper portion 52y may present an increased stiffness along they axis, resulting in an increased tuning frequency along the y axis, which in its turn results in the aimed-at larger difference in damping frequencies in along the y axis and the z axis. The stiffness along the z axis may be influenced to some degree by the bridge 70, but to a much smaller degree compared to the increased stiffness along the y axis. This is because the damper body formed by the damper portion 52y and the stiffening bridge 70 will operate in a completely new way during a damping operation.

Figure 7A:
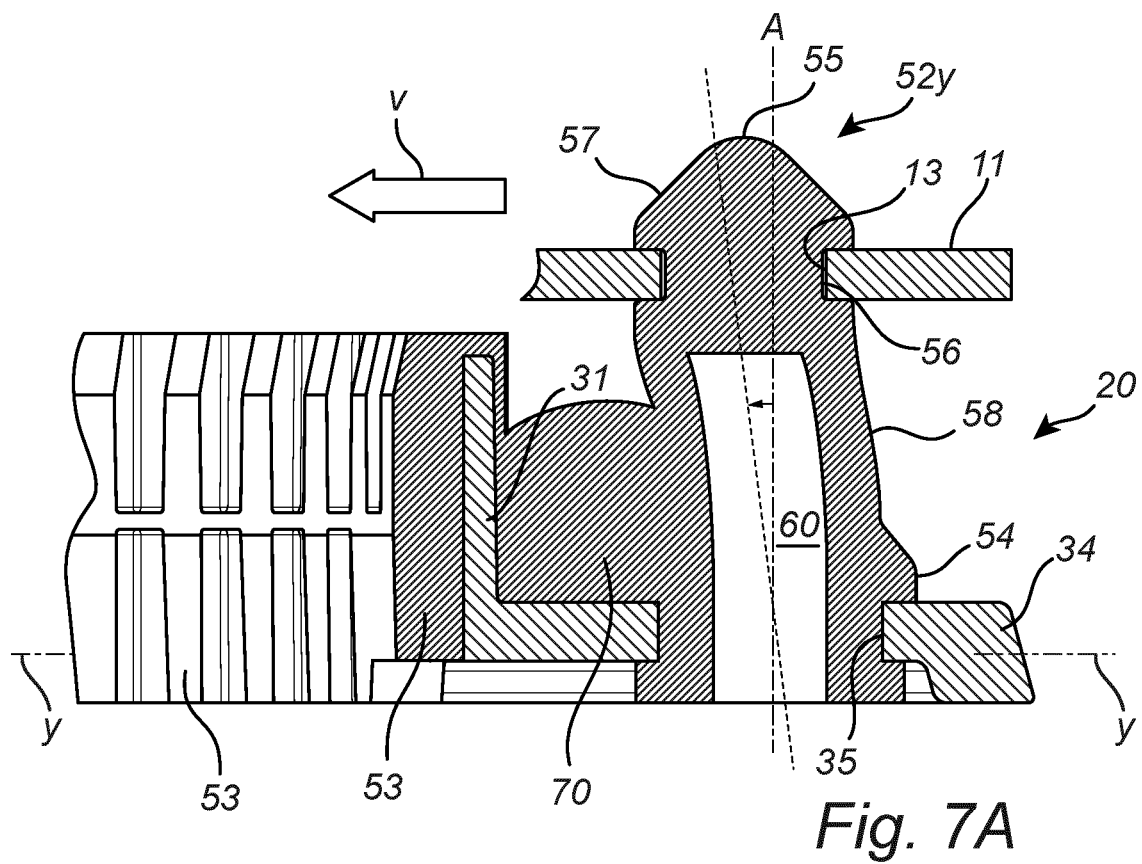
FIGS. 7A and 7B schematically illustrate different damping modes.
Figure 7B:
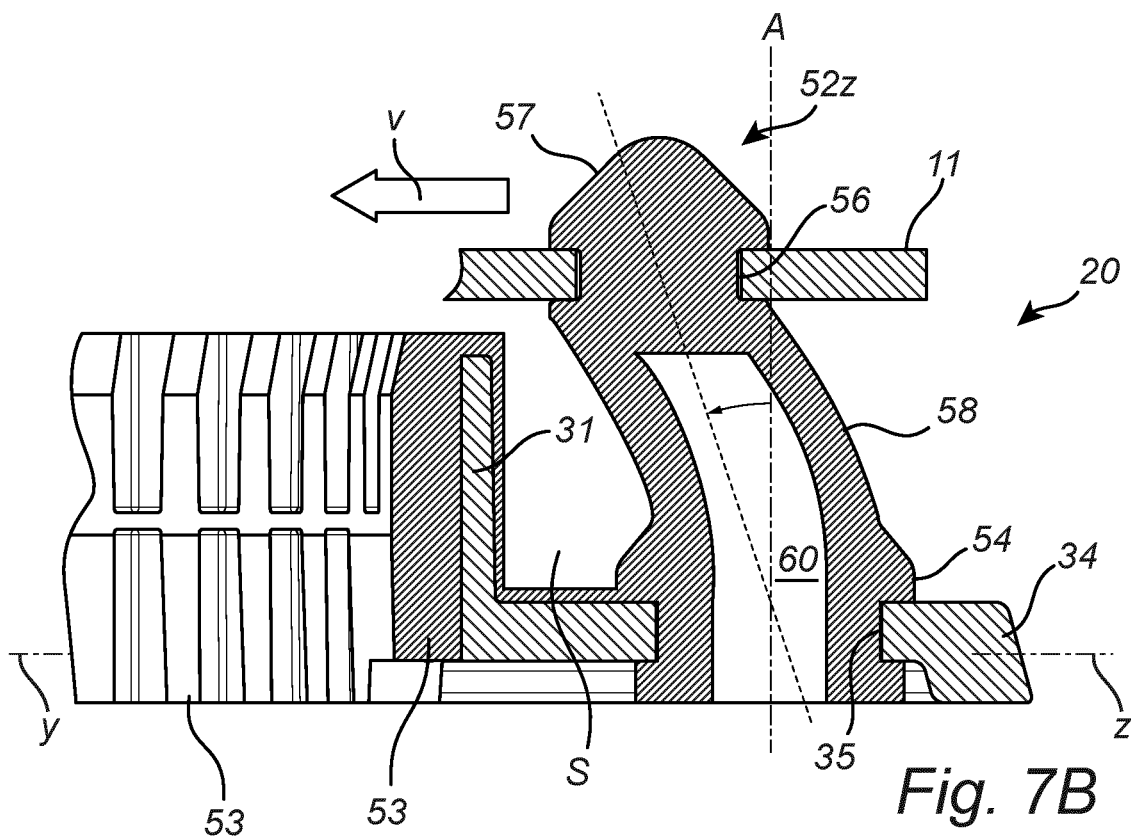

FIG. 7A illustrates a damping operation along the y axis according to the inventive concept. As in FIG. 7B, the movement and change of shape of the damper portion 52y and the bridge 70 is exaggerated for explanation purposes. In practice, the movements may be in the order of perhaps 1 mm or less. In contrast to the shear-mode damping shown in FIG. 7B with respect to damping along the z axis, the damper body (52y+70) operates with a combination of compression-mode damping and shear-mode damping. Depending on the design and choice of tuning parameters, the compression-mode damping may be dominant over the shear-mode damping.

During vibration along the y axis as indicated by an arrow V in FIG. 7A, the stiffening bridge 70 as such may operate essentially in compression-mode only, as schematically illustrated by the (exaggerated) concave top surface 72 of the bridge 70. Compression mode is generally a stiffer mode than the shear mode. Accordingly, the stiffening bridge 70 may limit the shear-mode movement of the damper portion 52y. As a result, the overall damper body 70, 52y may be substantially stiffer than the non-stiffened damper portions 52z along the y axis, making it possible to obtain an essentially higher tuned frequency along the y direction, and accordingly a larger difference between the tuned frequencies in along the y and z directions. As mentioned above, the influence of the bridges 70 on the damping along the z axis is limited, so the net result is an increased frequency difference. At least one reason why the effect of the bridges 70 on the damping along the z axis is limited is that the bridges 70 will essentially not operate in compression mode along the z axis, but rather in shear mode. As an example, if the bridge 70 has a rectangular cross-section perpendicular to the x axis, this rectangular cross-section may tend to become essentially slightly rhombic when the damper portion 52y moves along the z axis and subject the bridge 70 to shear forces in the z direction, i.e. essentially a shear-mode deformation of the bridge which will influence the damper portion 52y much less than the compression-mode in along the y axis.

According to the inventive concept, the stiffening bridges 70 are connected to wall portions 33 of the more rigid mounting frame 34. The term "connected" is here to be interpreted as not only being in contact but attached or bonded. This attachment or bonding may result directly from the molding process, and/or by use of adhesives. Accordingly, when the inflator 10 moves to the right instead in FIG. 7A, there will be a corresponding tensioning in the bridge 70 along the y axis, said tensioning also serving to stiffen the overall operation of the damper portion 52y along the y axis. It will therefore be appreciated that in the present embodiment, the two stiffening bridges 70 located on opposite sides of the mounting frame 30 operate in pair. When one stiffening bridge 70 is compressed, the other one is tensioned, and vice versa, both sides contributing to the increased stiffness and increased tuning frequency. In the present application, the term "compression-mode damping" relates to this operation with alternating compression and tensioning of the stiffening bridges 70.

The dimensions, shape and other design parameters of the bridges 70 may be used as additional frequency-tuning parameters. Some of these parameters will be discussed in the following.

As shown in FIG. 6A, each stiffening bridge 70 has a bottom surface 71 attached or bonded to the associated mounting tab 34, a top surface 72, and a radially inner part 73 attached or bonded to the outer surface 31b or the frame wall 32 at wall portions 33. The inner part 73 is also in contact with the annular portion 53 via a small tongue of elastomeric material extending over the frame wall 31. The height of the bridge 70 along the main axis A is indicated at reference H in FIG. 6A. In the present application, the height H of the bridge 70 is to be understood as corresponding to a level L5 of the bridge 70 at the interface I closest to the peripheral outside of the vibration portion 52y. Furthermore, in some embodiments, the stiffening bridge 70 may not extend all the way down to level L1 in contact with the mounting tab 34 or the mounting frame 30. Accordingly, each stiffening bridge 70 constitutes an elastomeric connecting element which connects the main part 58 of the elastomeric damper portion 52y to the frame wall 31 at one or more levels/portions between the level L3 of the mounting groove 56 and level L1, in such a way that a stiffening effect on the main part 58 is achieved along the y axis. To obtain this stiffening effect, the bridge 70 may connect at least the main art 58 of the damper portion 52y to the associated wall portion 31 at a location along the main axis A between a top of the base 54 and the distal end 55 of the damper portion. This connection may be continuous along the main axis A as in the illustrated embodiment, or non-continuous along the main axis A. The bridge connection may extend all the way down to level L1 as in the illustrated embodiment, or extend to a level above level L1, or combinations thereof. The bridge is a stiffening bridge in the sense that it is structured and arranged to stiffen the damper portion 52y with respect to damping movements of the main portion 58 along the y axis. Accordingly, the stiffening bridge 70 should be connected at least to the main portion 58 of the damper portion 52y which is moving along the y axis during a damping operation. The width of the bridge 70 in the z direction is indicated at W in the top view in FIG. 4

Figure 6B:
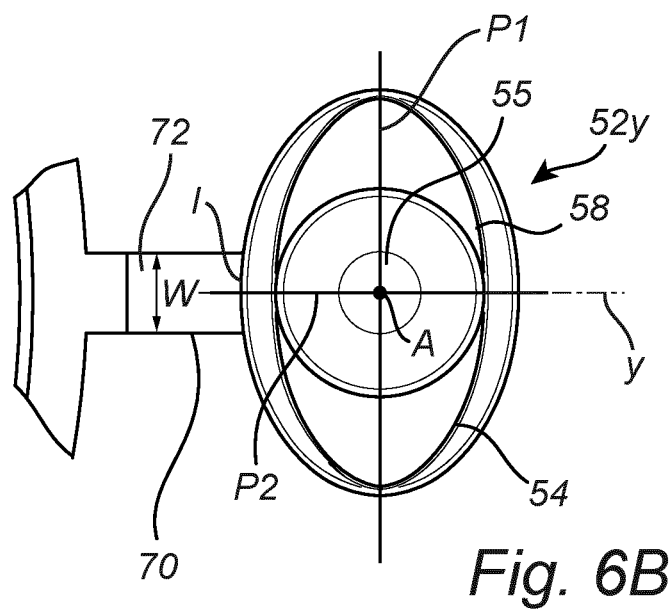
FIGS. 6B and 6C illustrate a top view and a cross-sectional view, respectively, of an elastomeric body in the damper device in FIG. 3.
Figure 6C:
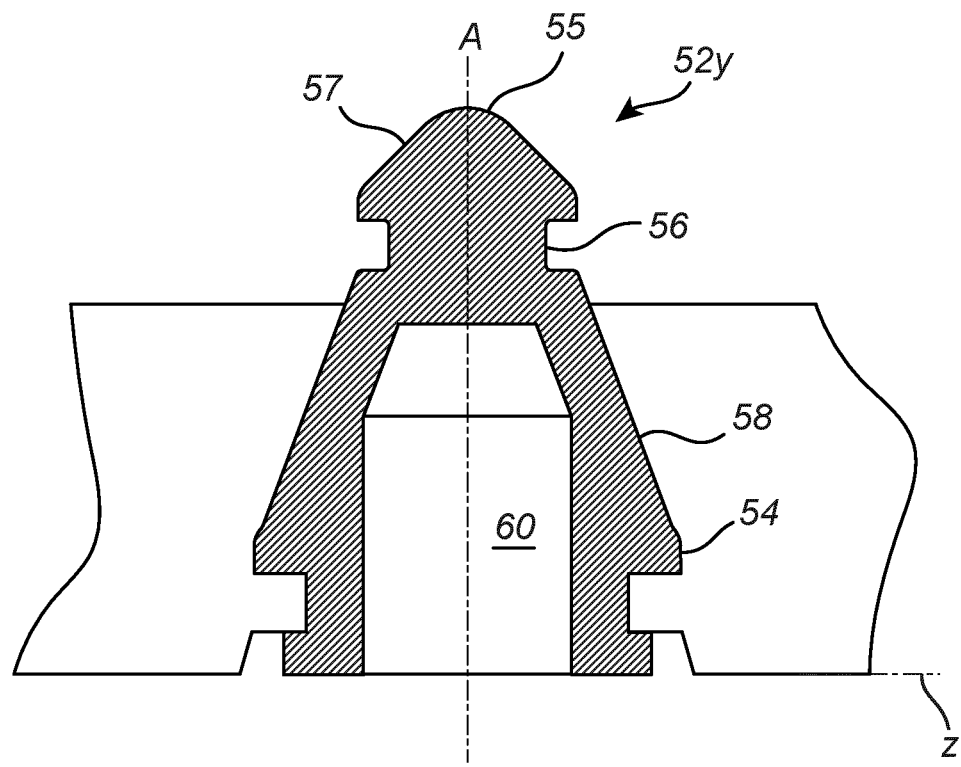

As shown in FIGS. 6A to 6C, each stiffening bridge 70 associated with one of the two damper portions 52y bridges the space S which is present at the two other damper portions 52z located on the z axis. In the illustrated embodiment, the stiffening bridges 70 extend in the y direction. and the bottom surface 71 of each bridge 70 is in contact with and attached to the upper surface of the associated mounting tab 34 of the mounting frame 30. The height H of the bridge 70 measured from level L5 in FIG. 6A is selected such that the top surface 72, at least closest to the damper portion 52y at the interface "I", is located above the base 54 and below the mounting groove 56, i.e. somewhere along the main part 58 of the damper portion 52y. Since the purpose of the bridges 70 is to stiffen the damper portions 52y with respect to movements along the y axis, it may be preferred to select a rather large value for H, and in some embodiments a maximum value such that the bridge 70 extends all the way up to or very close to the mounting groove 56. In order to achieve an even higher stiffening effect, the radially inner part 73 of the bridge 70 may in some embodiments be located even higher and extend all the way up to the top of the wall portion 33, thus resulting in a top surface 72 of the bridge 70 which is non-parallel to the yz plane.

The height H of the stiffening bridges 70 represents a new frequency-tuning parameter of the damping device 20, in addition to known tuning parameters relating to the damper portions 52 as such. The higher up the bridge 70 extends on the damper portion 52y, especially on the main portion 58, the larger stiffening effect is obtained. As examples, the bridge height H may be selected such that it is at least 10% of the L1-L3 distance, at least 25% of the L1-L3 distance, or at least 50% of the L1-L3 distance. The width W of the bridge 70, the radial extension of the bridge 70, and the elastomeric material of the bridge 70 also represent new frequency-tuning parameters that may be selected individually.

As best seen in the cross-sectional view in FIG. 6B, each stiffening bridge 70 extends along the y axis and has a limited extension W parallel to the z axis, leaving a major part of the outer peripheral surface of the damper portion 52y exposed or free. As a result, each elastomeric damper body formed by the stiffening bridge 70 and the damper portion 52y presents the feature of being at the same time:

asymmetric with respect to a first plane P1 which extends through the main axis A and is parallel to the xz plane, and symmetric with respect to a second plane P2 defined by the main axis A and the y axis.

This asymmetric/symmetric design of an elastomeric damper body for use in a dynamic vibration damper differs substantially from prior-art damper elements which do not present such an asymmetry/symmetry combination, or even the first-mentioned asymmetry with respect to the plane P1. This feature allows for obtaining aimed-at larger differences in tuned frequencies.

This asymmetry/symmetry of the damper bodies (52y+70), resulting from the use of stiffening bridges on one side only of the elastomeric portions 52y, may combined with an additional asymmetry by using non-circular symmetric elastomeric damper portions 52y, such as the oval design used in the illustrated first embodiment. Such an asymmetry of the damper portions 52y is apparent from a comparison of the cross-sectional views in FIGS. 6A and 6C. In the cross-sectional view in FIG. 6A, the wall 61 of the main part 58 appears cylindrical, whereas it appears frusto-conical in the cross-sectional view in FIG. 6C. Also, the inner cavity 60 appears rectangular in FIG. 6A, while it has a different shape in FIG. 6C.

$2^{nd}$ Embodiment

Figure 8A:
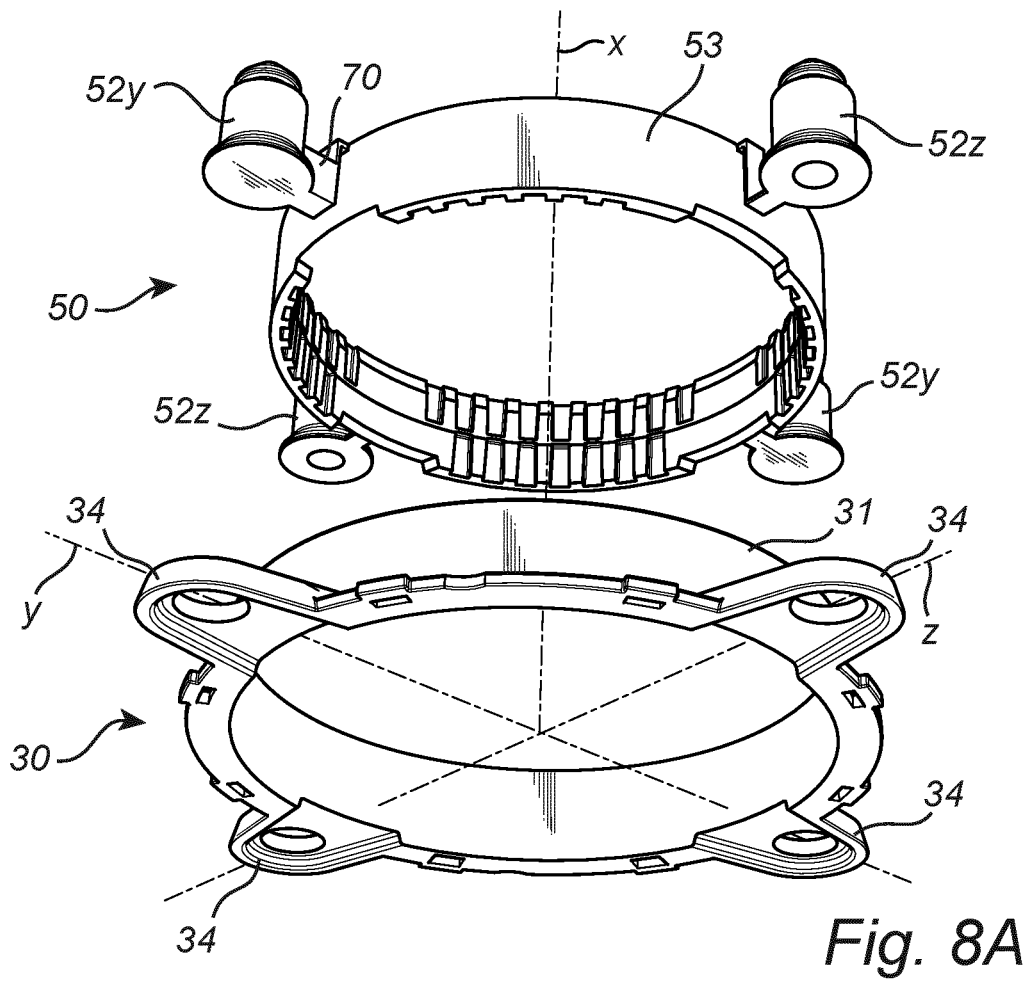
FIGS. 8A to 8C illustrate a damper device according to a second embodiment.
Figure 8B:
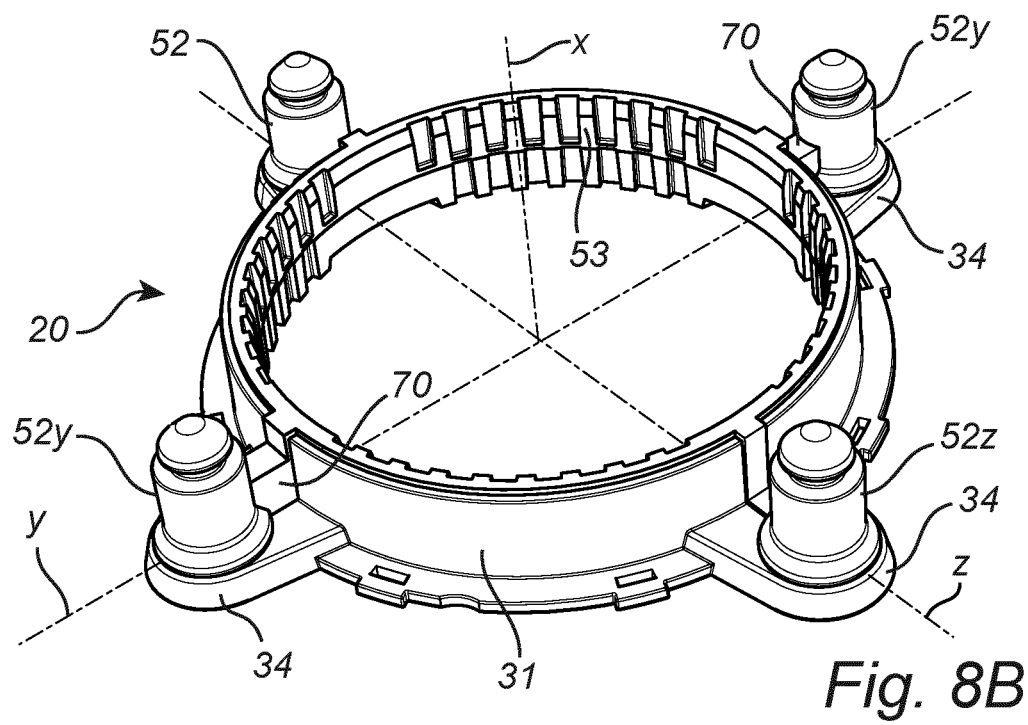

FIGS. 8A and 8B illustrate a damper device 20 according to a second embodiment of the inventive concept, wherein same reference numerals are used as in the first embodiment. Variants and effects described for the first embodiment apply to the second embodiment also. The second embodiment differs in the design of the four elastomeric damper portions 52y, 52z. Each damper portion 52y, 52z has a circular-symmetric outer shape with respect to its main axis A, instead of the oval design in the first embodiment. Further, the design of the inner cavities 60 differs in that the damper portions 52y on the y axis have no inner cavities, making them stiffer, and in that the damper portions 52z on the z axis each has a circular cylindrical cavity 60 of a height corresponding to the cavity height in the first embodiment.

Variants of the $2^{nd}$ Embodiment

Figure 9A:
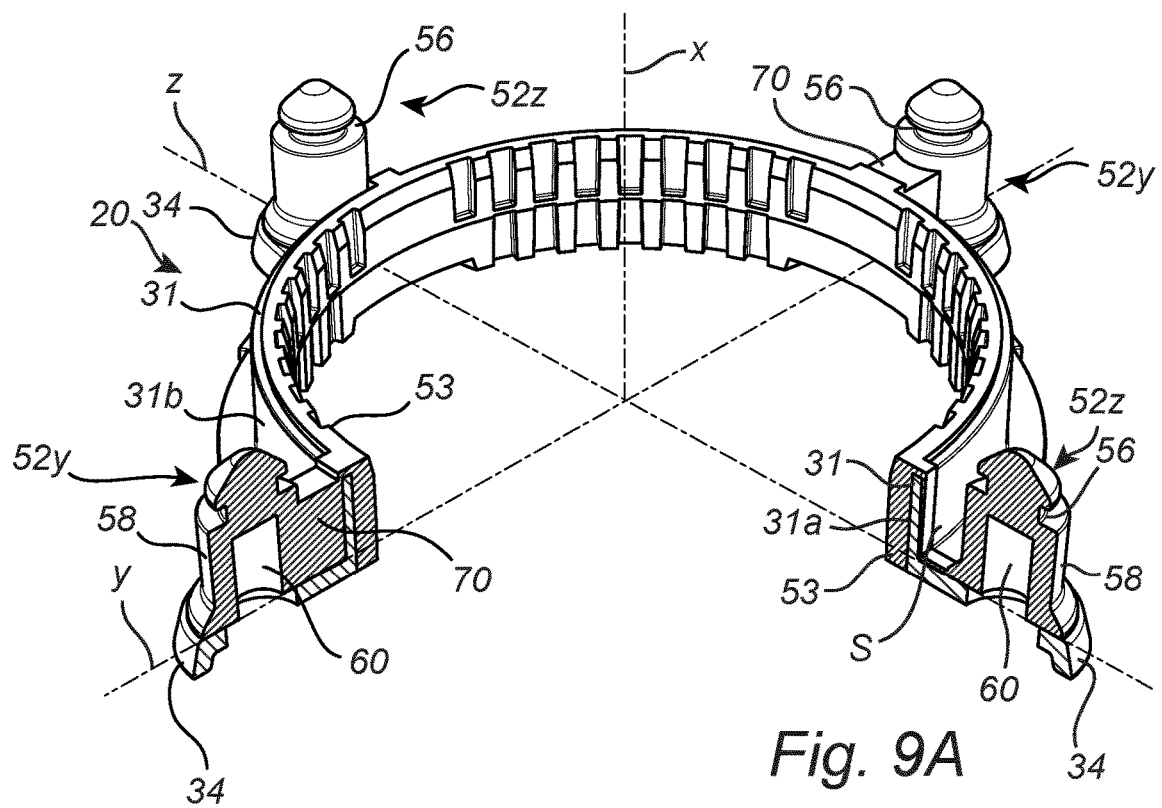
FIGS. 9A to 9D illustrate additional embodiments of a damper device.

FIGS. 9A to 9F illustrate variants of the damper device 20 in which different frequency-tuning parameters are selected, and in which all damper portions 52 have a circular symmetric outer shape In FIG. 9A, the two stiffening bridges 70 have a larger height and extend up to the mounting groove and to the top of the frame wall 31, resulting in an increased stiffness and, accordingly, a higher tuned frequency along the y axis.

Figure 9B:
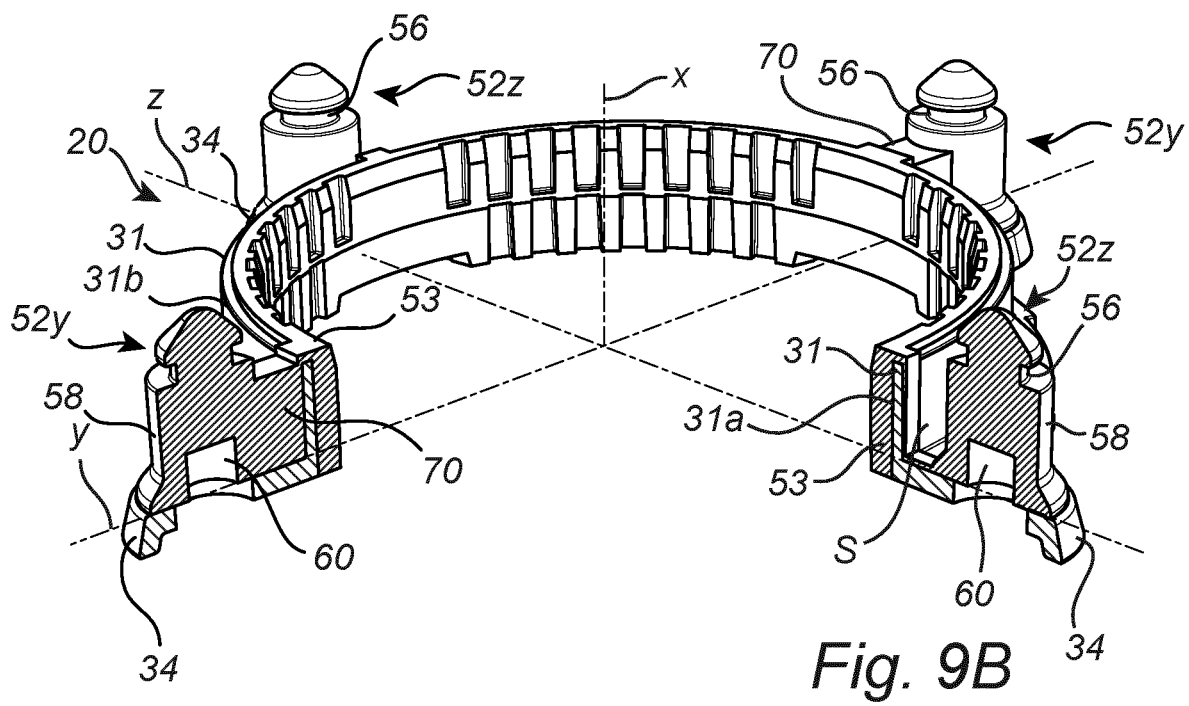

In FIG. 9B, the two stiffening bridges 70 also have a larger height. All four inner cavities 60 have a smaller height C1, resulting in an increased stiffness along both the y axis and the z axis.

Figure 8C:
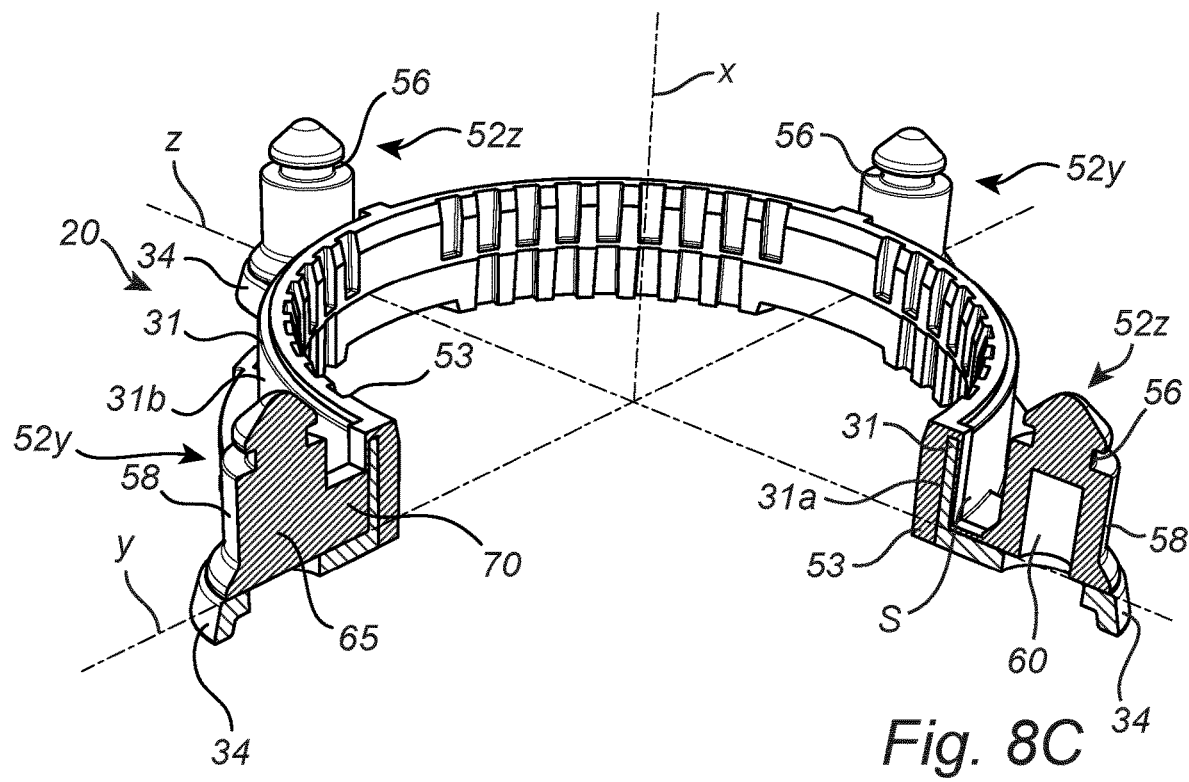
Figure 9C:
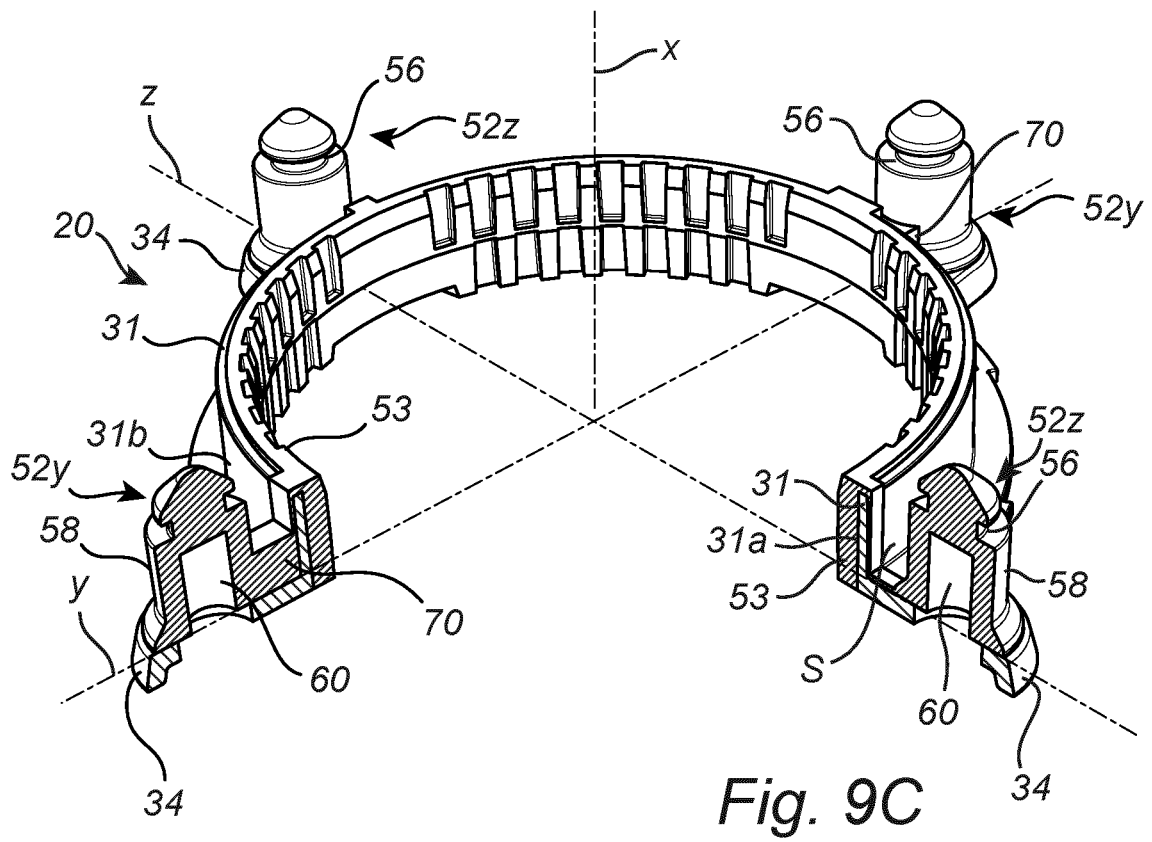

In FIG. 9C, the bridge height is essential the same as in FIGS. 8A to 8C, and all four cavities 80 has a height essential the same as the two cavities 60 in FIGS. 8A to 8C.

Figure 9D:
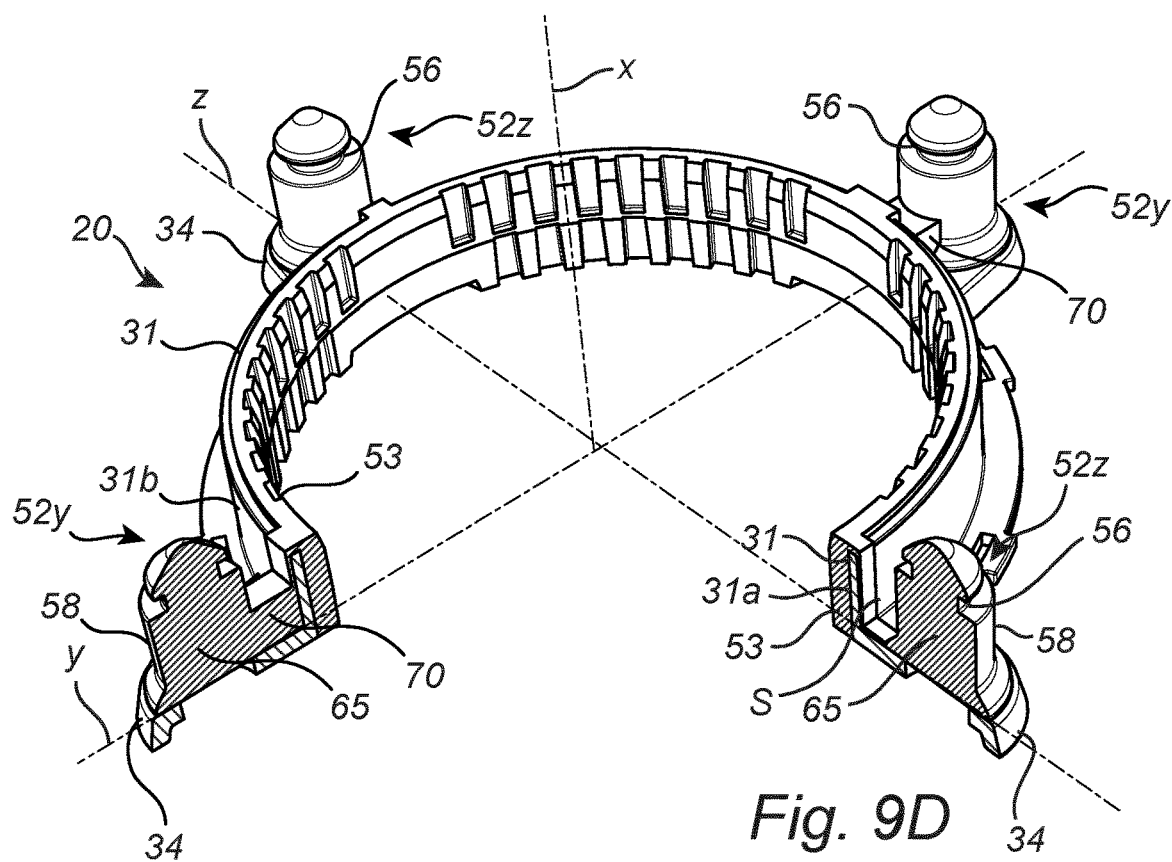

In FIG. 9D, the bridge height is essential the same as in FIGS. 8A to 8C, but there are no inner cavities 60 making all the damper portions 52y and 52z stiffer.

$3^{rd}$ Embodiment

Figure 10:
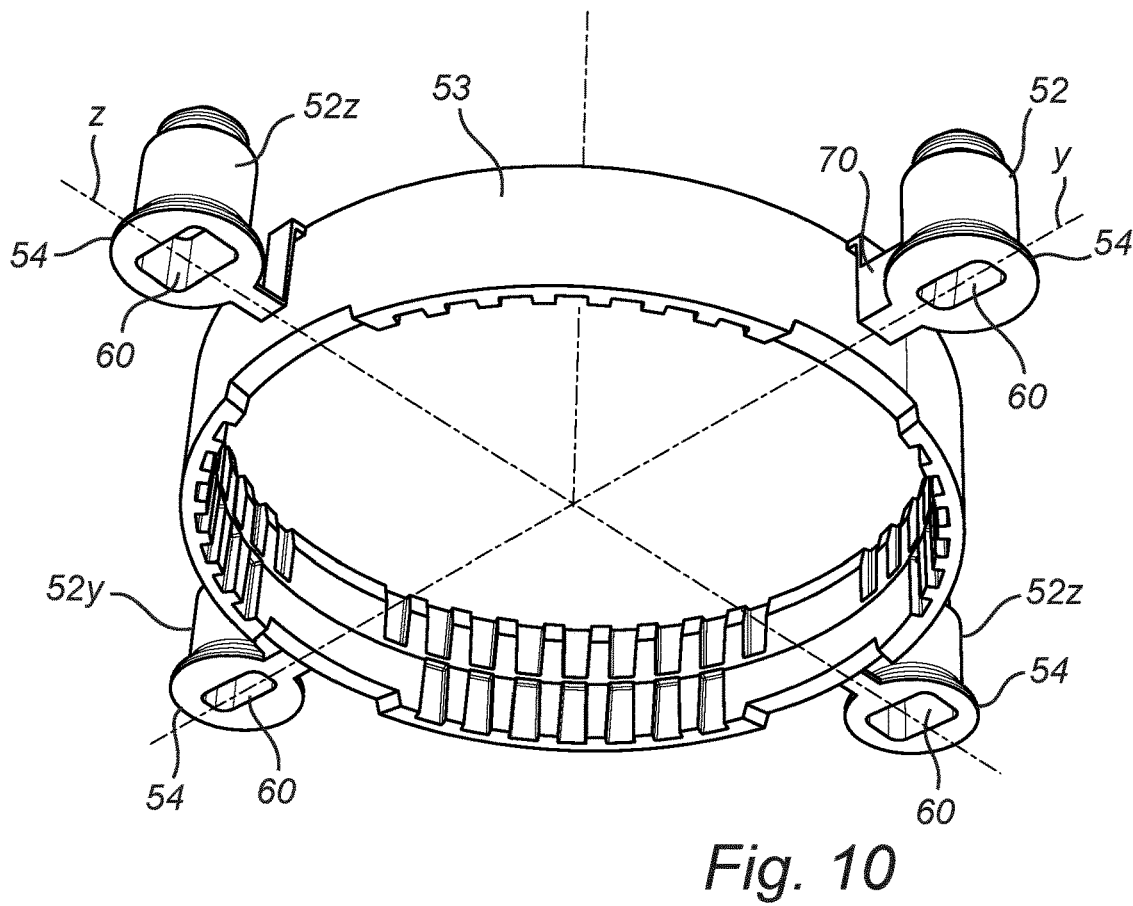
FIG. 10 illustrates a further embodiment a damper device.

FIG. 10 illustrates a damper device 20 according to a third embodiment of the inventive concept. In FIG. 10, each damper portion 52y, 52z has a circular-symmetric outer shape with respect to its main axis A. Each damper portion 52y, 52z also has an inner cavity 60. In this embodiment, the inner cavities 60 all have an elongate cross-section with major axis and a minor axis. This design makes each damper portion 52 stiffer in the direction along the major axis of the cavity 60 compared to the stiffness in the direction along the minor axis of the cavity 60. Furthermore, all four cavities 60 are oriented in the same direction such that the major axis of each cavity 60 is parallel with the y axis. Accordingly, each damper portion 52 contributes in itself to making the damping stiffer along the y axis. In addition, the bridges 70 stiffening the two damper portions 52y contribute to making the dampening even stiffer in along the y axis. In variants of this embodiments, the outer shape of the damper portions may also have an elongate cross-section, such as oval or elliptic. The inner cavities 60 may also have an oval or elliptic cross section over at least a part of their height.

FIG. 11A to 11E show examples on how a damper portion 52 for use in any of the previous embodiments may be frequency-tuned by varying one or more of different design parameters. Each damper portion 52 has an outer shape with an elongate or oval cross section, wherein a major axis is indicated at M-M and a minor axis is indicated at m-m. In all the variants, the inner cavity 60 has a main cavity part 60a in level with the main part 58 of the damper portion 52, a base cavity part 60b in level with the base 54 of the damper portion 52, and a top cavity part 60c in level with the mounting groove 56 of the damper portion 52. In designing the inner cavity 60, it is mainly the shape of the main cavity part 60a which influences the frequency tuning. The top cavity part 60c is primarily used for receiving a tool for pushing the damper portions into the mounting openings 13 of the inflator 10. The top cavity part 60c may also facilitate deformation of the top part of the damper portion 52 during insertion into the mounting openings 13 of the inflator 10. In all of the variants in FIGS. 11A to 11E, a vertical cross section of the main cavity part 60a has a frusto-conical shape when viewed along the minor axis m-m, and a rectangular shape when viewed along the major axis M-M. Accordingly, both the outer oval shape of each damper portion 52 and the design of the inner cavity 60 of each damper portion makes the damper portion 52 stiffer along the major axis M-M compared to the stiffness along the minor axis m-m. FIG. 11A to 11E illustrate how frequency tuning may be accomplished by varying the height of the main cavity part 60a and/or the wall thickness along the main portion 58.

It will be apparent from the above disclosure that the frequency-tuning of a damper device and a damper assembly according to the inventive concept may be accomplished by varying one or more tuning parameters included in a wide range of available tuning parameters, including at least the following:
- the elastomeric material,
- the dimensions and the shape of the stiffening bridges (the height H, the width W, etc.),
- the height L1-L2 of the damper portions 52y, 52z, especially the height of the main part 58,
- the outer dimensions and shape of the damper portions 52y, 52z,
- using inner cavities 60 or not (optionally a mix),
- the dimensions and shape of the inner cavities 60 (height, cross-section, etc.),
- the wall thickness of the main part 58, which may also vary in the circumferential direction, and
- the inclination of the wall 61, which may also vary in the circumferential direction.

Alternative Embodiments

The embodiments described above and as shown in the figures may be varied in many ways within the scope of the claims. For instance, stiffening bridges are arranged along the y axis only in the illustrated embodiments. If a higher frequency would be desired along the z axis, while still maintaining a required frequency difference between the y and z axes, it may be possible to use lower stiffening bridges at the damper portions on the z axis also.

The invention claimed is:

1. A vibration damper device for connecting a vibrating structure to a damper mass for forming a frequency-tuned damper assembly, comprising:
   two or more elastomeric damper portions; and
   a mounting frame made from a more rigid material than the elastomeric damper portions, said mounting frame extending in a main plane, and presenting a pair of frame wall portions extending transversally to the main plane,
   wherein each elastomeric damper portion extends along a main axis of the elastomeric damper portion from a base of the elastomeric damper portion connected to the mounting frame at the main plane to a distal end of the elastomeric damper portion,
   wherein each elastomeric damper portion presents a main part located along the main axis between the base and the distal end of the elastomeric damper portion, and
   wherein said elastomeric damper portions comprise a first pair of elastomeric damper portions connected to the mounting frame at locations spaced along a first axis extending in the main plane;
   said vibration damper device further comprising a pair of elastomeric stiffening bridges,
   wherein each elastomeric stiffening bridge is associated with a respective elastomeric damper portion of said first pair of elastomeric damper portions,
   wherein each elastomeric stiffening bridge connects at least the main part of the associated elastomeric damper portion to an associated one of said frame wall portions at a location along the main axis between the base and the distal end of the associated elastomeric damper portion, for stiffening the associated elastomeric damper portion with respect to damping movements along said first axis,
   wherein each elastomeric stiffening bridge and its associated elastomeric damper portion are made in one piece with each other from an elastomeric material to form an elastomeric damper body,
   wherein said two or more elastomeric damper portions further comprise a second pair of elastomeric damper portions connected to the mounting frame at locations mutually spaced along a second axis extending in the main plane and transversally to the first axis, and
   wherein each elastomeric damper portion of the second pair of damper portions is connected to the mounting frame at its base only and is not stiffened by any elastomeric stiffening bridge.

2. The vibration damper device according to claim 1, wherein the elastomeric stiffening bridges extend substantially along the first axis.

3. The vibration damper device according to claim 2, wherein each elastomeric stiffening bridge has a limited extension in a circumferential direction relative to the main axis of the associated elastomeric damper portion and wherein the elastomeric damper body formed by the elastomeric stiffening bride and the damper portion is:
   asymmetric with respect to a plane which is perpendicular to the main plane and to the first axis, and
   symmetric with respect to a plane defined by the main axis and the first axis.

4. The vibration damper device according to claim 1, wherein each elastomeric damper portion presents a circumferentially extending mounting groove at a distance from its distal end; and wherein each elastomeric stiffening bridge connects the associated elastomeric damper portion to the associated frame wall portion between the base and the mounting groove of the associated elastomeric damper portion.

5. The vibration damper device according to claim 4, wherein each one of the elastomeric stiffening bridges extends to a bridge height level in the direction of the main axis of the associated damper portion which is at least 10% of a distance between the main plane and the mounting groove of the associated elastomeric damper element.

6. The vibration damper device according to claim 5, wherein each one of the elastomeric stiffening bridges extends to a bridge height level in the direction of the main axis of the associated damper portion which is at least 25% of a distance between the main plane and the mounting groove of the associated elastomeric damper element.

7. The vibration damper device according to claim 6, wherein each one of the elastomeric stiffening bridges extends to a bridge height level in the direction of the main axis of the associated damper portion which is at least 50% of a distance between the main plane and the mounting groove of the associated elastomeric damper element.

8. The vibration damper device according to claim 1, further comprising an elastomeric annular part, which is connected to and extends along the mounting frame and which is made in one piece with the elastomeric damper portions and the elastomeric stiffening bridges.

9. The vibration damper device according to claim 1, wherein some or all of said two or more elastomeric damper portions present, over at least a part of the elastomeric damper portion along the main axis of the elastomeric damper portion, a cross-section which is not rotational symmetric with respect to the main axis of the damper portion.

10. A frequency-tuned damper assembly adapted to be connected to a vibrating structure presenting vibrations of different vibration frequencies in different directions, said damper assembly comprising:
    a vibration damper device according to claim 1; and
    a damper mass which is connected to the distal ends of the elastomeric damper portions of the vibration damper device,
    wherein the frequency-tuned damper assembly is frequency-tuned to two different frequencies corresponding to said different vibration frequencies of the vibrating structure.

11. The frequency-tuned damper assembly according to claim 10, wherein the damper mass includes an inflator.

12. A vibration damper device for connecting a vibrating structure to a damper mass for forming a frequency-tuned damper assembly, comprising:
    two or more elastomeric damper portions; and
    a mounting frame made from a more rigid material than the elastomeric damper portions, said mounting frame extending in a main plane, and presenting a pair of frame wall portions extending transversally to the main plane,
    wherein each elastomeric damper portion extends along a main axis of the elastomeric damper portion from a base of the elastomeric damper portion connected to the mounting frame at the main plane to a distal end of the elastomeric damper portion,
    wherein each elastomeric damper portion presents a main part located along the main axis between the base and the distal end of the elastomeric damper portion, and
    wherein said elastomeric damper portions comprise a first pair of elastomeric damper portions connected to the mounting frame at locations spaced along a first axis extending in the main plane;
        said vibration damper device further comprising a pair of elastomeric stiffening bridges,
    wherein each elastomeric stiffening bridge is associated with a respective elastomeric damper portion of said first pair of elastomeric damper portions,
    wherein each elastomeric stiffening bridge connects at least the main part of the associated elastomeric damper portion to an associated one of said frame wall portions at a location along the main axis between the base and the distal end of the associated elastomeric damper portion, for stiffening the associated elastomeric damper portion with respect to damping movements along said first axis,
    wherein each elastomeric stiffening bridge and its associated elastomeric damper portion are made in one piece with each other from an elastomeric material to form an elastomeric damper body, and
    wherein the main part of each elastomeric damper portion is arranged to undergo primarily a shear deformation during damping operation of the vibration damper device.

13. A method for manufacturing a vibration damper device according to claim 12, said method comprising molding all elastomeric damper portions and all elastomeric stiffening bridges in one piece with an elastomeric annular portion of the mounting frame.

14. The method according to claim 13, wherein the vibration damper device is manufactured using one single 2K injection molding machine, wherein the elastomeric damper portions, the stiffening bridges and the annular portion together form one component and the mounting frame forms a second component, said first and second components being bonded to each other in the molding process.

15. A frequency-tuned damper assembly adapted to be connected to a vibrating structure presenting vibrations of different vibration frequencies in different directions, said damper assembly comprising:
    a vibration damper device according to claim 12; and
    a damper mass which is connected to the distal ends of the elastomeric damper portions of the vibration damper device,
    wherein the frequency-tuned damper assembly is frequency-tuned to two different frequencies corresponding to said different vibration frequencies of the vibrating structure.

16. The frequency-tuned damper assembly according to claim 15, wherein the damper mass includes an inflator.

* * * * *